(12) United States Patent
Armagost et al.

(10) Patent No.: US 12,447,922 B1
(45) Date of Patent: Oct. 21, 2025

(54) AIRBAG HOUSING

(71) Applicant: Zoox, Inc., Foster City, CA (US)

(72) Inventors: Daniel Scott Armagost, San Mateo, CA (US); Joao Pedro Damasio Simoes De Oliveira, Leamington Spa (GB); Anthony Iannone, Los Altos, CA (US); David Maurice Libeaut, Bidford-on-Avon (GB); Syed Mohsin Ahmed Naqvi, Foster City, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 18/811,585

(22) Filed: Aug. 21, 2024

(51) Int. Cl.
*B60R 21/2155* (2011.01)
*B60R 21/207* (2006.01)

(52) U.S. Cl.
CPC ........ *B60R 21/2155* (2013.01); *B60R 21/207* (2013.01)

(58) Field of Classification Search
CPC .......................... B60R 21/207; B60R 21/2155
See application file for complete search history.

(56) References Cited

U.S. PATENT DOCUMENTS

| | | | |
|---|---|---|---|
| 7,530,595 B2 * | 5/2009 | Naruse | B60R 21/21 280/730.2 |
| 7,669,889 B1 | 3/2010 | Gorman et al. | |
| 9,975,515 B2 * | 5/2018 | Tanabe | B60N 2/986 |
| 10,800,369 B2 * | 10/2020 | Hioda | B60R 21/26 |
| 11,485,311 B2 * | 11/2022 | Yamabe | B60R 21/2171 |
| 2007/0182131 A1 * | 8/2007 | Helbig | B60R 21/2165 280/730.2 |
| 2009/0020988 A1 | 1/2009 | Sato et al. | |
| 2009/0039623 A1 * | 2/2009 | Kawabe | B60R 21/207 280/728.3 |
| 2013/0009431 A1 | 1/2013 | Acker et al. | |
| 2016/0009247 A1 * | 1/2016 | Fujiwara | B60R 21/2171 280/728.2 |
| 2016/0068129 A1 | 3/2016 | Tanabe et al. | |
| 2019/0135218 A1 | 5/2019 | Takahashi | |
| 2020/0094771 A1 | 3/2020 | Jost | |

FOREIGN PATENT DOCUMENTS

JP 5664537 B2 * 2/2015

OTHER PUBLICATIONS

United States non-final Office Action dated May 23, 2024, for U.S. Appl. No. 18/241,083.
United States final Office Action dated Oct. 31, 2024, for U.S. Appl. No. 18/241,083.

* cited by examiner

*Primary Examiner* — Faye M Fleming
(74) *Attorney, Agent, or Firm* — EIP US LLP

(57) ABSTRACT

A vehicle airbag system, comprises: (A) a housing comprising an opening, (B) an airbag, configured to expand from a stowed state to a deployed state in response to a trigger, wherein the airbag: (i) is located inside the housing while in the stowed state, and (ii) extends out of the opening while expanding to the deployed state, and (C) a hinged door, configured to: extend across the opening to close the opening while the airbag is in the stowed state, and pivot away from the opening due to the airbag expanding to the deployed state.

20 Claims, 11 Drawing Sheets

AIRBAG HOUSING

BACKGROUND

Vehicles may be equipped with side airbags to protect passengers riding therein during impact with an object, such as, for example, another vehicle. Placement of such side airbags may make it difficult to install, inspect, and/or repair which may ultimately impact the safety of occupants of the vehicles employing them.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
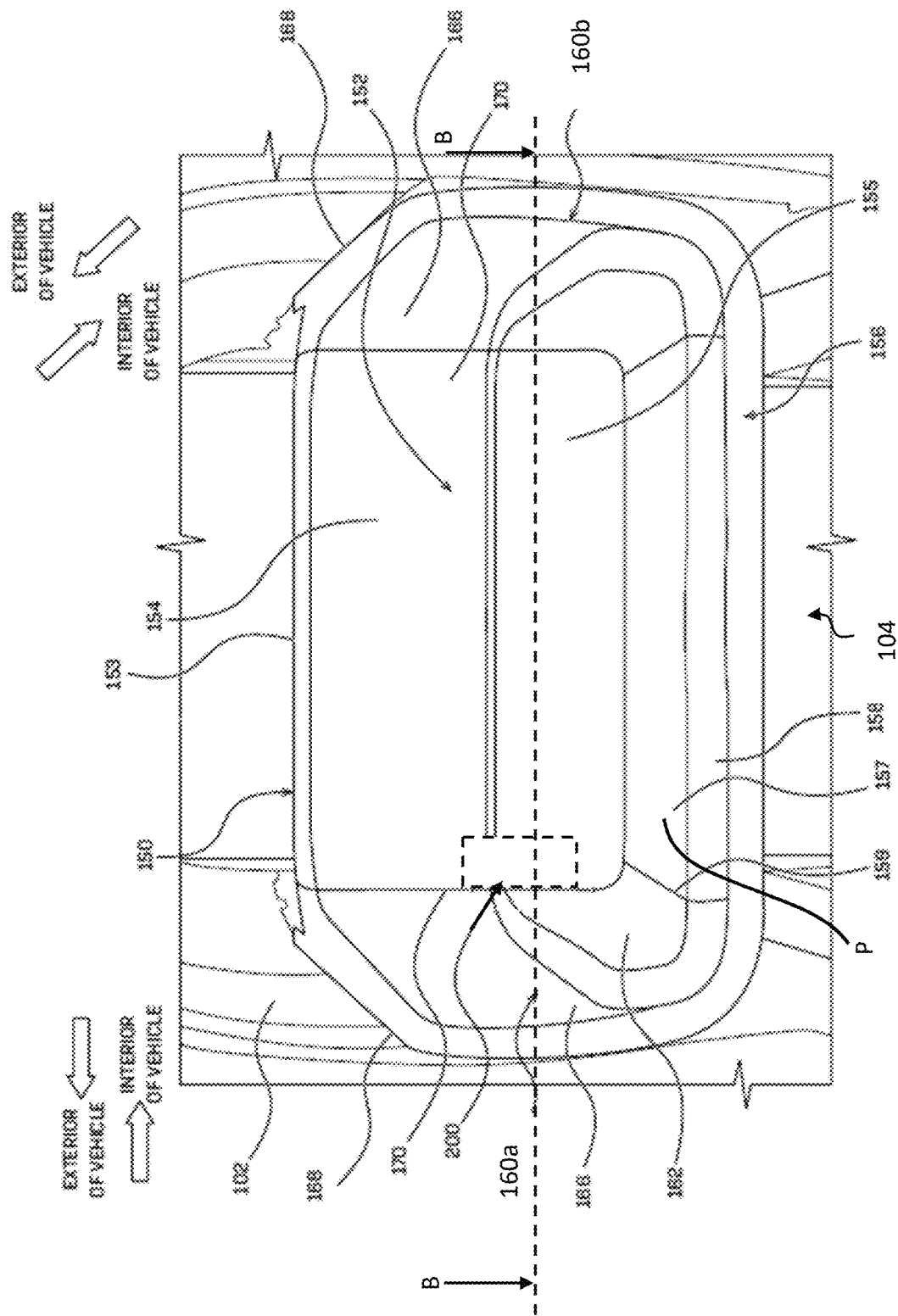
FIG. 1 is a perspective view illustrating an example seat assembly within a vehicle having an example airbag system.

This application relates to airbag systems and vehicles comprising one or more airbag systems. Airbag systems described herein include a housing for storing an airbag, where the housing has an opening. The airbag system also includes a door that opens and closes via a hinge (e.g., a living hinge). The hinged door can extend across the opening thereby closing the opening and the housing.

Under normal circumstances, the airbag is located within the housing in a stowed state (that is, not inflated/deployed). Based on a trigger, such as receipt of an impact signal from an impact sensor, an inflator may be configured to inflate the airbag. Inflating the airbag causes the airbag to expand from the stowed state to a deployed state. In the deployed state, the airbag is filled with a fluid, such as a gas, so that the airbag may absorb an impact force.

As a result, the airbag increases in volume during deployment and extends out of the opening of the housing. In some cases, the deployment of the airbag "pushes" the hinged door open as it expands, and the door pivots away from the opening. In some cases, the airbag system may also have a door engagement component for holding and/or locking the door in place with respect to the housing when the door is closed. To release or "unlock" the door from the engagement with the door engagement component, the housing may deform from its original shape/configuration as the airbag expands into the deployed state. For example, the airbag and/or the inflator may generate a force that causes the housing to be deformed. This deformation can cause the perimeter of the opening to expand and/or change shape, and as a result, the door may disengage with the door engagement component, thereby allowing the door to open and pivot away from the opening. Example door engagement components can therefore limit access behind the door by requiring the housing itself to be deformed, or by bending/deforming the door (which may be done via a special tool).

Having an airbag system with a hinged door can provide one or more advantages. For example: (i) the door can protect the airbag from being damaged or tampered with when the airbag is not in use (i.e., in the stowed state), which may be enhanced further in example airbag systems that include a door engagement component to hold the door closed, (ii) the door may push or move one or more objects out of the way as the airbag is deployed, and thereby act as a protective layer between the one or more objects and the airbag, to avoid the airbag being damaged during deployment, (iii) a door that can be opened and closed when needed can allow access to any components that may be located behind the door, such as the airbag itself, or a seat fixing mechanism, a fuse box, etc., without needing parts to be reset or replaced (in contrast to an airbag stored behind a tearable seam, for example), and (iv) having a door extending across the opening of the housing can provide a continuous backing for a seat behind which the airbag system may be located, making it more comfortable for a passenger to sit against.

As such, according to a first aspect of the present disclosure, there is provided a vehicle, comprising: (A) a body defining a passenger compartment, (B) a seat assembly comprising a back portion, and (C) an airbag system positioned behind the back portion relative to the passenger compartment, and comprising: (a) a housing comprising an opening and a door engagement component, (b) an airbag, configured to expand from a stowed state to a deployed state in response to a trigger, wherein the airbag: (i) is located inside the housing while in the stowed state, and (ii) extends out of the opening while expanding to the deployed state, and (c) a hinged door comprising a free end, wherein the free end is configured to: engage with the door engagement component while the airbag is in the stowed state, such that the hinged door extends across the opening to close the opening, and disengage with the door engagement component and pivot away from the opening due to the airbag expanding to the deployed state.

A body of a vehicle may be alternatively referred to as a chassis. For example, the body may have a roof surface, a floor surface, two side surfaces, a front surface and a back surface. The front surface may face forwards as a vehicle moves in a particular direction and the back surface may face backwards as the vehicle moves in the particular direction. In examples, the vehicle may be substantially symmetrical, so that the vehicle appears the same whether it is driving in one particular direction or an opposite direction. As such, a back surface of the body may become a front surface of the body, should the vehicle move in the opposite direction. A longitudinal direction may extend between the front and back surfaces of the vehicle. A lateral direction may extend between the two side surfaces of the vehicle. The body is not limited to vehicles having a unibody construction. In examples, the body may comprise a body that is assembled from multiple components.

In examples, the vehicle may be an autonomous vehicle.

In examples, a passenger compartment is a space in which zero or more passengers may be located during typical use of the vehicle. A seat assembly arranged against a surface of the vehicle, such as a back surface, may therefore form a boundary of the passenger compartment.

The airbag may be a side airbag. A side airbag may protect a side of a passenger during a side impact. For example, another vehicle or object may collide with a side of the vehicle. As well as being positioned behind the back portion of the seat assembly, the airbag system may also be positioned at, or towards, one side of the back portion, such that the airbag may expand to one side of the passenger that is seated against the back portion. The seat assembly may comprise a side portion arranged adjacent to the back portion, and the airbag may expand through a gap between the side portion and the back portion. When deployed, the airbag may extend outwards from the back portion, into the passenger compartment, and along at least a part of the side portion. It will be appreciated that the term "gap" may mean a channel or space through which the airbag can expand. In some cases, the side portion and back portion may abut each other, so while there may be no physical spacing between the side and back portions, there would still be a gap because the airbag can pass between the side and back portions.

A seat assembly, in examples, may comprise a back portion, a side portion, and a seat portion. The back portion may provide support for a passenger's back. The seat portion may provide a seat base upon which the passenger may sit. The side portion may be positioned at an outer side of the seat assembly and may provide a side support for a passenger and/or act as a barrier between the passenger and the body of the vehicle, such as one of the side surfaces.

The back portion may comprise an interior facing surface. The back portion may comprise an exterior facing surface, opposite the interior facing surface. As used herein, interior may refer to components or surfaces which are positioned further into an interior of the vehicle as compared to other exterior components or surfaces. An interior facing surface may be considered the surface facing or proximal to a passenger, when present on the seat assembly. An interior facing surface may therefore be considered to be the surface facing into the passenger compartment. The exterior facing surface may therefore be considered the surface facing away from the passenger compartment.

In examples, reference to a first component being "behind" a second component relative to the passenger compartment, may mean that the first element is further away from the passenger compartment than the second component. For example, in the context of the airbag system being positioned behind the back portion relative to the passenger compartment, the exterior facing surface of the back portion may face the airbag system, and the interior facing surface of the back portion may face away from the airbag system and towards the passenger compartment.

In examples, the airbag system may be configured for use with a seat assembly that takes the form of a bench seat mounted in the passenger compartment of a vehicle. In examples, the vehicle may have a carriage style seating arrangement where bench seats face each other within the passenger compartment. An example carriage style seating arrangement is shown and described in U.S. Pat. No. 11,117, 543, which is incorporated herein by reference in its entirety for all purposes. The passenger compartment of a carriage style seating arrangement may be defined between the bench seats. A bench seat may be a seating arrangement designed to seat multiple passengers and may comprise a common or shared seating surface for the multiple passengers. In examples, a bench seat may be constructed without conventional vehicle seat features such as a bolster.

In examples, the door that closes the airbag housing may open outwards relative to an inside of the housing. In examples, the door may open towards the passenger compartment.

In examples, the door engagement component may be attached to or form part of the housing. In other examples, the door engagement component may be attached to or form part of another part of the vehicle, such as another part of the airbag system or the seat assembly.

In examples there may be one or more door engagement components.

In examples, the door may extend fully across the opening of the housing, such that a single door closes the opening.

The airbag system may comprise a hinge, where the hinge enables the door to be a hinged door. The hinge may form part of the door, such as a living hinge, or it may be a separate component to which the door is coupled.

A free end of the door may be an end of the door that is opposite to or positioned away from a hinge or hinged end of the door. The door may therefore have a hinged end and a free end. The free end may not necessarily relate to only the outer edge of the door opposite the hinge but may encompass a greater region of the door that extends away from the outer edge of the door and towards the hinged end of the door. In a particular example, however, it may be an outer edge of the door at the free end of the door that engages the door engagement component. When a door engagement component engages with the outer edge of the door, it may be more reliably disengaged during deployment of the airbag than when another part of the door engages with the door engagement component.

In examples, the airbag system may further comprise an inflator configured to inflate the airbag in response to the trigger. In some examples, the trigger may be a signal. The inflator may be configured to inflate the airbag upon receipt of an impact signal from an impact sensor. The impact sensor may detect a collision or other impact and send an electrical signal to the inflator to cause the inflator to deploy the airbag (e.g., fill the airbag with gas). Additionally, or alternatively, the vehicle may include perception sensors configured to perceive objects in an environment of the vehicle and send sensor data to a vehicle computing device. The perception sensors may include, for example, image capture devices (RGB cameras, intensity cameras, infra-red cameras, stereo cameras, depth cameras, etc.), light detection and ranging (LIDAR) sensors, and radio detection and ranging (RADAR) sensors, or the like. In some examples, the vehicle computing device may receive sensor data from the perception sensors and may determine that an impact is imminent. In some examples, a determination that an impact is imminent may be based on a time associated with an impact being within a threshold time (e.g., 3 seconds, 5 seconds, etc.). The threshold time may be a pre-determined amount of time and/or may be based on a speed of the vehicle and/or the object, an acceleration of the vehicle and/or the object, weather, traffic density, and/or other considerations. Based on a determination that the impact is imminent, the vehicle computing device may send a signal to the inflator to cause the inflator to fill the airbag with gas prior to or concurrently with the impact.

The inflator may include a cold gas inflator, a pyrotechnic inflator, a hybrid inflator, or any other inflator configured to fill the airbag with gas.

In some examples, the airbag may include a single compartment configured to hold gas. In other examples, the airbag may include multiple compartments configured to hold gas. In such examples, the multiple compartments may include different sizes, shapes, materials, gas pressures, or the like.

In examples, the door may be constructed from plastic, which can be durable, flexible and lightweight. In a particular example, the door is constructed from a thermoplastic polyolefin (TPO), which is particularly durable and flexible, so is less likely to break apart. Such a material is useful for a door which can be subjected to large forces.

The door may be alternatively referred to as a lid.

As briefly mentioned above, in examples, the hinged door may comprise a living hinge. The hinge may therefore be a part of the door, rather than requiring the door to be affixed to a separate hinge. The use of a living hinge, in contrast to a separate hinge, reduces the number of parts required to provide the hinged action of the door. Fewer separable parts may increase safety because separate parts may become loose during a vehicle collision. In addition, the flexibility and durability of living hinges make them ideal for an application where repeated bending is required, as they can withstand many cycles of movement without breaking. In examples where the door abuts the back portion of the seat assembly, movement of a passenger against the back portion may cause the door and the hinge to be subjected to particular forces. Accordingly, use of a living hinge can reduce the likelihood of the hinge being damaged as a result of those forces being applied to the back portion.

In some examples, an access panel may be positioned behind the back portion of the seat assembly and may be fixed in place via a fixing component such as a bolt. One or more components of the vehicle may be located behind the access panel, such as a fuse box. Locating such components behind the access panel can stop passengers from easily accessing the components. To open the access panel, a user, such as maintenance personnel, may need to access the fixing component. For example, the bolt may be unscrewed, thereby allowing the access panel to be opened. To further reduce the likelihood of a passenger from accessing the one or more components behind the access panel, the fixing component may be located behind the door, meaning that the door first needs to be opened to access the fixing component. Access to the fixing component may therefore be restricted while the door is closed. In examples comprising a door engagement component, the door may also need to be disengaged with the door engagement component before the door can be opened. In some cases, this may be done via a tool. For example, the tool may unlock the door engagement component or may cause the door to bend so that it can disengage from the door engagement component.

Accordingly, in examples, the back portion may be positioned to face towards the passenger compartment, the seat assembly may comprise an access panel positioned behind the back portion with respect to the passenger compartment, the vehicle may comprise a fixing component configured to releasably fix the access panel in place within the vehicle, a portion of the hinged door may extend beyond the opening when the hinged door closes the opening, and the fixing component may be positioned behind the portion of the hinged door with respect to the passenger compartment when the hinged door closes the opening.

In examples, the back portion may abut the access panel, or there may be a gap/spacing between the back portion and the access panel. In examples, the back portion may abut the hinged door or there may be a gap/spacing between the back portion and the hinged door.

In an example, the fixing component that fixes the access panel in place within the vehicle is also used to connect or otherwise affix the hinged door to the access panel. Accordingly, in examples, the fixing component is configured to connect the hinged door to the access panel. The hinged door is therefore anchored to the access panel and both the hinged door and access panel are fixed in place via a single fixing component, thereby reducing the number of components required. For example, this can avoid having to use a second fixing component to fix the hinged door in place within the vehicle, such as to another part of the vehicle or another part of the access panel. As will become apparent from the later discussion, this configuration also reduces the likelihood of the hinged door coming loose when the airbag is deployed.

Additionally or alternatively, although the fixing component is positioned behind the closed door, a second fixing component may connect the hinged door to another part of the access panel. This arrangement can have the benefit of reducing the likelihood of a passenger from accessing the fixing component to remove the access panel, but this does require an additional fixing component.

In these examples, because the fixing component is located behind the closed door, the configuration of the door and access panel may be such that at least part of the door and at least part of the access panel may lie within a plane that is parallel to a plane defined by the back portion of the seat assembly to provide a continuous surface extending in front of the fixing component, which may be more comfortable for a passenger to sit against.

In some examples, rather than having the fixing component behind the door (as in the first and second examples mentioned above), the same fixing component may connect the hinged door to the access panel, but the door need not be opened to access the fixing component, which may mean it is easier for a passenger to obtain unauthorized access to the access panel. This configuration may define a gap between the access panel and hinged door (in other words, there may not be a continuous surface for a passenger to sit against).

In examples where both the access panel and hinged door are connected to each other via the same fixing component, the access panel and door may also be connected to the housing via the fixing component. For example, the housing may comprise a connecting portion to which the fixing component is connected. The connecting portion may be a protruding portion that extends away from the housing. In a particular example, the connecting portion may extend away from the housing to define a connecting surface, where the connecting surface is parallel to, but offset from, the hinged door while the hinged door closes the opening. Put another way, the opening may be formed on a plane that is parallel to the connecting surface.

The access panel may therefore be fixed in place within the vehicle by being fixed to the housing itself. The housing may be fixed to the body of the vehicle, such as via a second connecting portion. The door and access panel are therefore connected/fixed to the housing via the connecting portion. Fixing these components to the housing itself can ensure all the components react or move in unison when the airbag is deployed, reducing the likelihood of the components separating and becoming loose.

Accordingly, in examples, the fixing component is configured to connect the access panel and the hinged door to a connecting portion of the housing.

In examples, a seat trim may cover the back portion of the seat assembly. As will be understood, a seat trim is a layer of material that covers a seat within a vehicle. In certain examples, the door may be "sandwiched" between the back portion (such as an exterior surface of the back portion) and the seat trim. In effect, at least part of the door may therefore be covered by the seat trim. For example, an outer surface of the door (with respect to the opening of the housing) may abut or face the back portion of the seat assembly and an inner surface of the door (with respect to the opening of the housing) may be covered by the seat trim. In such examples, the seat trim may also cover the opening and be positioned between the door and the opening. When the door is opened, the seat trim may also move with the door to allow access to the opening of the housing, given that the seat trim is attached to and covers the door.

Accordingly, in examples, the seat assembly may comprise a seat trim, and the seat trim covers at least part of the back portion and encapsulates at least part of the hinged door, such that the hinged door is between the back portion and the seat trim.

The hinged door is therefore at least partially contained by the trim, which can reduce the likelihood of the door being ejected into the passenger compartment, even if the door breaks/snaps or is detached from the hinge, during a collision. Wrapping the door with the seat trim can also mean the back portion is "pushed" out of the way as the airbag inflates and the door opens because the back portion is effectively coupled to the door.

Containing the door within the seat trim can also reduce the likelihood of the door puncturing the airbag. For example, the seat trim may be made from a material that is softer and/or smoother than the exterior facing surface of the back portion of the seat assembly. In some examples, the part of the seat trim that covers the door (and so is likely to come into contact with the inflated airbag as it is deployed) may be made from a material selected specifically to reduce the likelihood of damaging the airbag. This material may, in some cases, differ from the seat trim material that covers the part of the back portion against which the passenger sits.

Accordingly, in examples, a first region of the seat trim covering the back portion may comprises a first material and a second region of the seat trim covering the hinged door may comprise a second material, the second material having a lower surface roughness than the first material. The seat trim may therefore transition into a smoother material in a region where the airbag is likely to contact the seat trim, which can help guide the airbag out of the housing and into the passenger compartment, while also reducing the likelihood of puncturing the airbag. The second material may be nylon material, for example. The first and second materials may be stitched or otherwise joined together.

As mentioned above, the housing may be arranged at, or in the region near to, a gap between the back portion of the seat assembly and a side portion of the seat assembly. The door may open away from the housing in a direction to increase the size of the gap between the back and side portions. For example, the opening of the door and deployment of the airbag may push the back portion away from the side portion or push the back and side portions away from each other, thereby opening the gap further. This can decrease the deployment time. To achieve this, while the airbag is in the stowed state, the hinge may be positioned further away from the gap than the free end of the door. The door therefore pivots away from the gap, rather than towards it.

Accordingly, in examples, the seat assembly comprises a side portion arranged adjacent to the back portion, wherein the free end of the hinged door is arranged relative to the side portion and back portion such that when the hinged door pivots away from the opening due to the airbag expanding to the deployed state, the airbag and hinged door cause the back portion to move relative to the side portion to increase a size of a gap between the back portion and the side portion, through which the airbag can pass.

According to a second aspect of the present disclosure, there is provided a vehicle airbag system, comprising: (A) a housing comprising an opening, (B) an airbag, configured to expand from a stowed state to a deployed state in response to a trigger, wherein the airbag: (i) is located inside the housing while in the stowed state, and (ii) extends out of the opening while expanding to the deployed state, and (C) a hinged door, configured to: extend across the opening to close the opening while the airbag is in the stowed state and pivot away from the opening due to the airbag expanding to the deployed state.

In examples, the vehicle airbag system may be arranged behind a seat assembly, as discussed above. In other examples however, the airbag system may be arranged elsewhere within a vehicle, such as in a roof of the vehicle. Similar and/or additional advantages may be achieved to those described above.

As discussed above, in some cases, the airbag system may comprise a door engagement component. Accordingly, in examples, the airbag system may comprise a door engagement component, wherein the hinged door is configured to: engage with the door engagement component when closing the opening, and disengage with the door engagement component due to the airbag expanding to the deployed state.

In other examples, the door may be held in the closed position by another component that abuts the door, such as the back portion of the seat assembly, without requiring a door engagement component.

As mentioned, in addition to or instead of the housing being deformable, the hinged door may be disengaged with the door engagement mechanism by bending the door. The bending may be achieved by hand, or via a special tool. Accordingly, in examples, the hinged door may be bendable such that the hinged door can be engaged and disengaged with the door engagement component while the airbag is in the stowed state. Having a flexible/bendable door means that the door can be opened and closed without needing to airbag to deploy. TPO may be a suitable material to achieve a desired flexibility.

In examples, the airbag system may comprise a tool configured to cause the hinged door to bend. A specially configured tool can be used to bend and thereby open the hinged door. The tool can be used by service personnel for maintenance, for example.

As briefly mentioned above, the door can be caused to disengage with the door engagement component by deforming the housing. Accordingly, in examples, the housing may be deformable upon exertion of a force by the airbag during expansion into the deployed state, and the hinged door may be configured to disengage with the door engagement component due to a change in shape of the opening when the housing deforms.

The door engagement component therefore automatically disengages with the door (such as a free end of the door) as a result of the deformation of the housing. This means that the door can be securely held closed prior to the airbag deploying.

In some examples, the door engagement component may form part of the housing itself. Accordingly, in examples, the housing may comprise the door engagement component, and the door engagement component may comprise a raised catch extending away from the opening and defining a recess configured to receive the hinged door. For example, a portion of the hinged door may be received in the recess, such as underneath the raised catch.

The raised catch is a simple but effective method of restricting access to the opening/housing by "locking" the door in place. In a particular example, the raised catch (or more generally the door engagement component) may be configured to pivot away from the opening of the housing (such as via bending). This can allow the door to be opened more easily while the airbag is stowed.

In examples, a tab or other protruding portion of the door may be received in the recess of the raised catch, thereby securing the door in place. The tab can provide a simple but effective method of restricting access to the opening by "locking" the door in place. In examples where the tab is received under the raised catch it may be more likely that the tab (and door) will be released from the recess of the catch when the housing deforms. Accordingly, in examples, a free end of the hinged door comprises a tab, and the tab is configured to be received in the recess defined by the raised catch.

In examples, the tab may be arranged at or near to the center of the free end of the hinged door. By arranging the tab and raised catch at the center of the free end of the hinged door, it is more likely that the tab and door will be released when the housing deforms because the deformation of the housing may be greatest at the center of a perimeter edge of the opening. The tab may therefore be arranged at an outer edge of the door.

The center of the free end may be measured along an outer edge of the door that is at an opposite end of the door compared to the hinge. A particular dimension (such as a length or width) of the free end may be measured in a direction parallel to a rotational axis of the hinged door, where the hinged door pivots around the rotational axis. The center of the free end may therefore be the center of the particular dimension.

As discussed, in examples, the airbag system may comprise a fixing component configured to connect the hinged door to a connecting portion of housing. One or more other components may also be attached to the connecting portion of the housing via the fixing component, such as an access door. In some cases, the seat trim, which may cover the door, may also be anchored/connected to the connecting portion.

In examples, the hinged door may be shaped so that it is attached to the connecting portion of the housing and then bends back on itself before extending across the opening of the housing to close the housing. The section that bends back in this manner may have a U-shaped cross section. This can allow the fixing component to be positioned behind the door when the door is closed, and also connect the door to the exterior of the housing (i.e., the connecting portion). The U-shape may also reduce the likelihood of the door from detaching from the housing when the airbag is deployed.

Accordingly, in examples, the hinged door extends beyond the opening and may have a U-shaped cross-section at an exterior of the housing when the hinged door extends across the opening of the housing, and the fixing component may extend into a space defined by the U-shaped cross-section and is accessible when the hinged door pivots away from the opening.

According to a third aspect of the present disclosure, there is provided a vehicle, comprising: (A) a body defining a passenger compartment, (B) a seat assembly comprising a back portion, and (C) an airbag system positioned behind the back portion relative to the passenger compartment, and comprising: (a) a housing comprising an opening, (b) an airbag, configured to expand from a stowed state to a deployed state in response to a trigger, wherein the airbag: (i) is located inside the housing while in the stowed state, and (ii) extends out of the opening while expanding to the deployed state, and (c) a hinged door, configured to: extend across the opening to close the opening while the airbag is in the stowed state; and pivot away from the opening due to the airbag expanding to the deployed state.

The vehicle and/or airbag system may have any or all of the components discussed in the above examples, such as the first and second aspects. Use of such an airbag system within a vehicle can improve the safety of the passenger(s) within the vehicle.

More detailed examples, as well as systems, method(s) and computer-readable media of the present disclosure will now be presented, with reference to the accompanying figures.

FIG. 1 depicts an example implementation of the present disclosure. In particular, FIG. 1 depicts an example of a seat assembly 150 for seating one or more passengers within a vehicle. FIG. 1 shows the interior of the vehicle, the vehicle having a body 102 defining a passenger compartment 104. As shown, a seat assembly 150 is disposed inside the body 102 of the vehicle. The seat assembly 150 may be a bench seat assembly, i.e., shaped for multiple passengers without a divide between adjacent seats. The body may comprise carbon fiber or any material suitable to serve as a body of a vehicle, such as steel or aluminum.

FIG. 1 illustrates directions as being towards the interior or the exterior of the vehicle. Surfaces of components within the vehicle may be defined with respect to these directions.

The seat assembly 150 may comprise a back portion 152, a seat portion 156, and at least one side portion 160a, 160b. In some examples, as in the illustrated example, the seat assembly 150 may comprise a first side portion 160a and a second side portion 160b located at opposite lateral end portions of the back portion 152 and seat portion 156. The back portion 152 may comprise an interior facing surface 154. The interior facing surface 154 may face into the passenger compartment 104 and face towards a passenger when the passenger is seated in the seat assembly 150. The back portion 152 may further comprise an exterior facing surface 153, opposite to the interior facing surface 154. The exterior facing surface 153 is not visible in FIG. 1. The back portion 152 may also comprise a back cushion 155. The side portion 160a, 160b may comprise an interior facing surface 166 and an exterior facing surface 168. The side portion 160a, 160b may comprise a side cushion 162. The seat portion 156 may comprise a seat cushion 157. In examples, the back cushion 155 and/or the side cushion 162 and/or the seat cushion 157 may be omitted. The seat portion 156 may be coupled to a floor surface of the vehicle or otherwise attached to the body 102 of the vehicle.

The seat portion 156 may define a seating area P for a passenger. In some examples, the seat portion 156 may be shaped so as to identify the seating area P. In examples, it should be appreciated that the seat portion 156, for example of a bench seat, may comprise two seating areas located adjacent each other on opposite lateral sides of seat portion 156 and share a common seating surface. In some examples, the seating area P may be indicated by markings on the seat portion 156. In some examples, the seating area P may be defined, at least in part, by a seam or gap between the seat portion 156 and the side portion 160a, 160b. In some examples the seating area P may be defined by a passenger restraint, such as a seat belt. A passenger restraint may be coupled to the seat portion 156 at a first mounting position, and may be attachable to a buckle that is coupled to the seat portion 156 at a second mounting position. The seating area P may be defined as being between the first and second mounting positions.

In some examples, the seat portion 156 may comprise a front edge or front surface 158. The front edge 158 may represent a longitudinal front of the seat assembly 150. The seat portion 156 may comprise an exterior side 159, i.e. a lateral side of the seat portion 156 that is proximal the vehicle exterior.

In examples, an airbag system 200 may be positioned behind the back portion 152 relative to the passenger compartment 104, such that the exterior facing surface 153 is facing towards the airbag system 200. In this particular arrangement, the airbag system 200 is positioned behind a gap 170 where the first side portion 160a meets or abuts the back portion 152. Additionally, or alternatively, an airbag system may be positioned where the second side portion 160b meets or abuts the back portion 152. The airbag system 200 comprises a housing which stores an airbag which, when inflated, extends through the gap and into the interior of the vehicle. For example, the airbag may extend out of the housing and towards the front surface 158 of the seat portion 156. The airbag may also expand along the side portion 160a, 160b (on an interior side of the vehicle) along the interior facing surface 166. The airbag may also expand into a space between the interior facing surface 166 of the side portion 160a, 160b and the exterior side 159 of the seat portion 156. In this way, as a passenger is seated within the seating area P, the airbag may expand without hitting the passenger.

In examples such as that illustrated in FIG. 1, the back portion 152 may extend continuously across the length of the seat assembly 150 (e.g., from a first side portion 160a to the second side portion 160b at the other lateral end of the seat assembly 150). In other examples, the back portion may comprise separate portions. For example, the back portion 150 may comprise a first back portion associated with a first seating position and a second back portion associated with a second seating position (and/or with a region between seating positions, for example a central region associated with an arm rest(s)). Such separate portions of the back portion 150 may be positioned to define seams or gaps between the separate portions. For example, a first back portion and a second back portion may be positioned to abut each other between the first back portion and the second back portion. In such examples, an airbag system 200 may be positioned behind respective back portions, similarly to how the airbag system 200 is positioned behind the gap 170 in FIG. 1.

Figure 2:
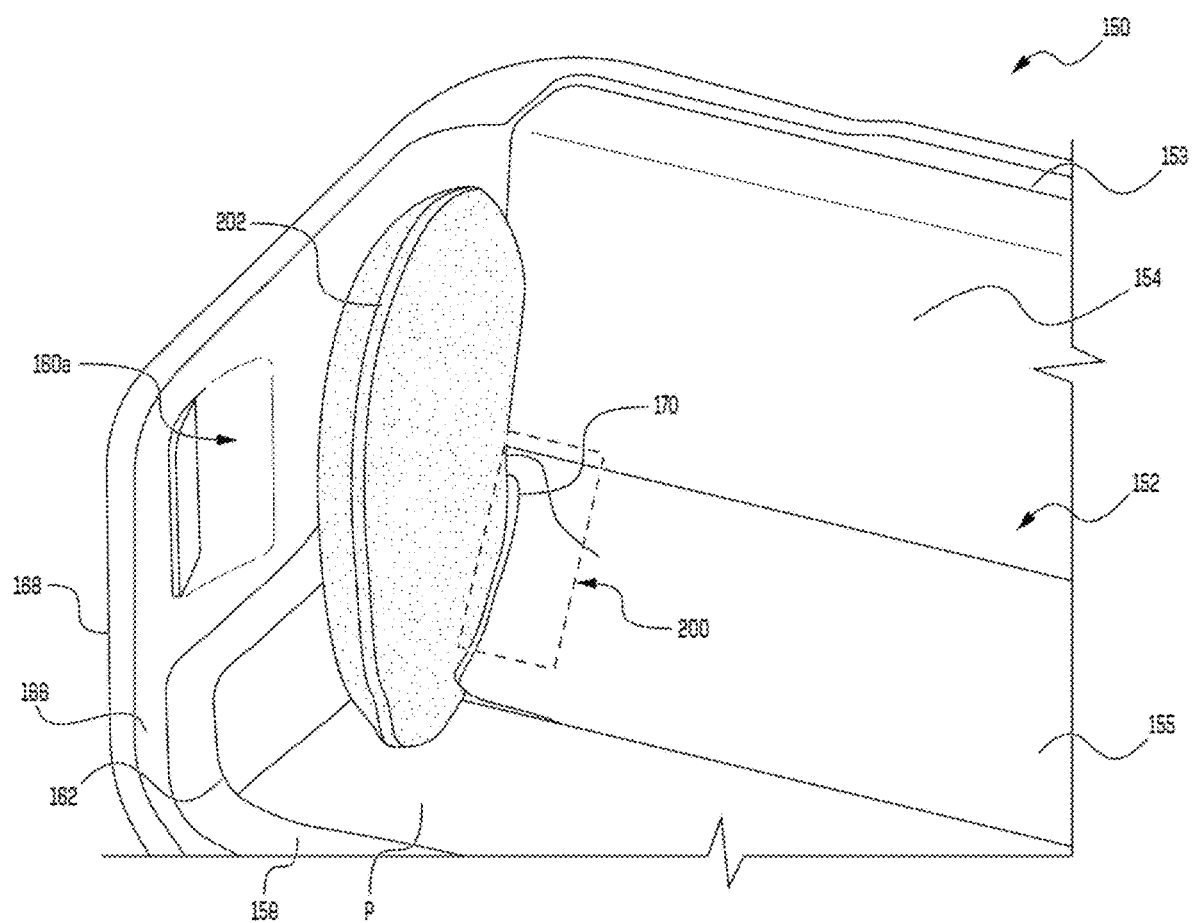
FIG. 2 is a perspective view illustrating a portion of the seat assembly of FIG. 1 having an example airbag in a deployed state.

FIG. 2 depicts part of the seat assembly 150 of FIG. 1, where an airbag 202 of the airbag system 200 has been deployed. As shown, when the airbag 202 is in a deployed state, the airbag 202 extends from the housing (not visible), which remains behind the back portion 152, through the gap 170 between the back portion 152 and the side portion 160a, and into the passenger compartment 104. The airbag 202 can therefore act as a side airbag to protect a passenger sat in the seating area P. FIG. 2 shows how the airbag 202 has "pushed" away a lateral side of the back portion 152, and in particular the back cushion 155, as it has inflated.

Figure 3A:
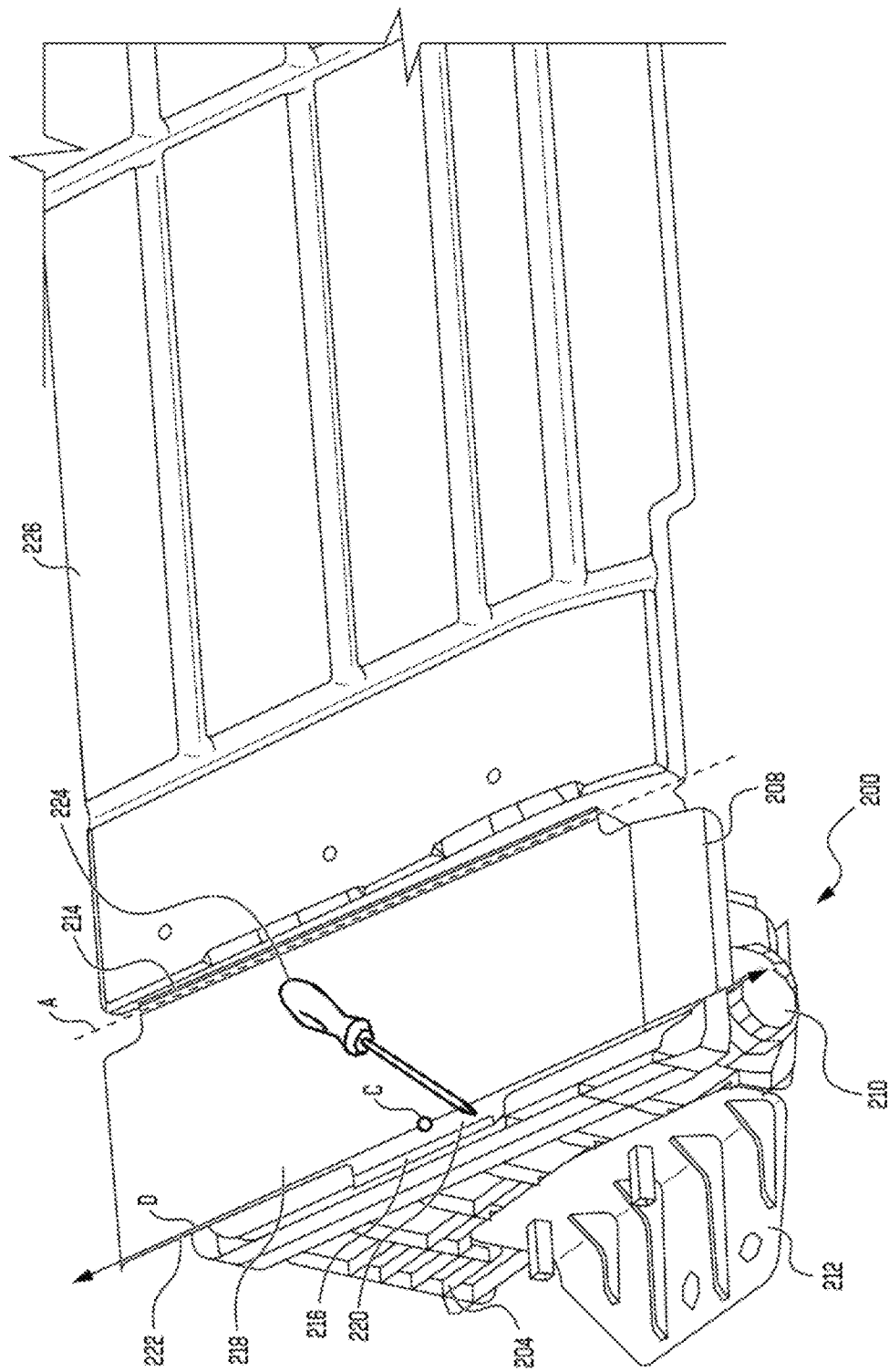
FIG. 3A is a perspective view illustrating an airbag system, with an airbag in a stowed state.
Figure 3B:
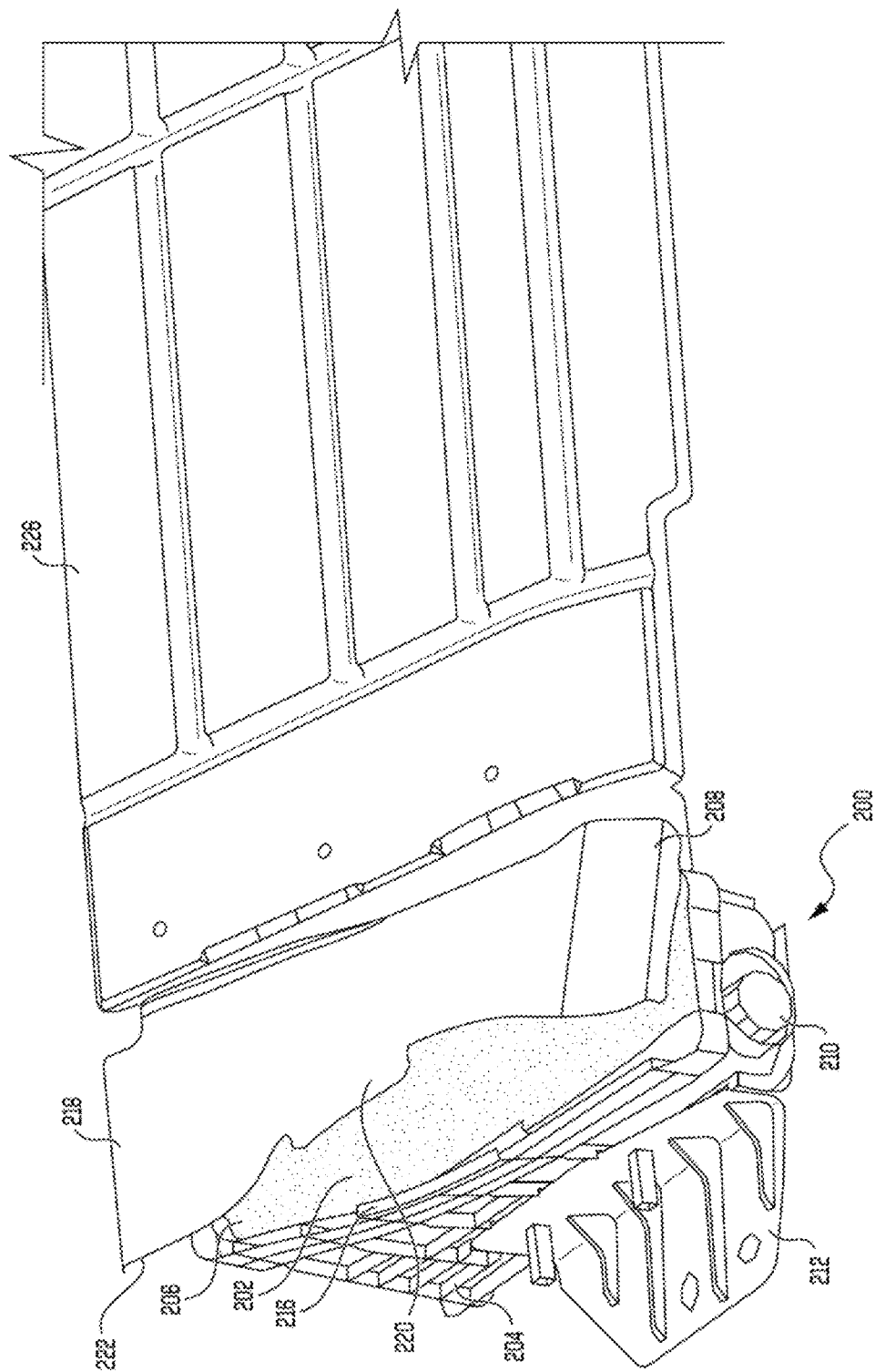
FIG. 3B is a perspective view illustrating the airbag system of FIG. 3A, with the airbag having been deployed.
Figure 3C:
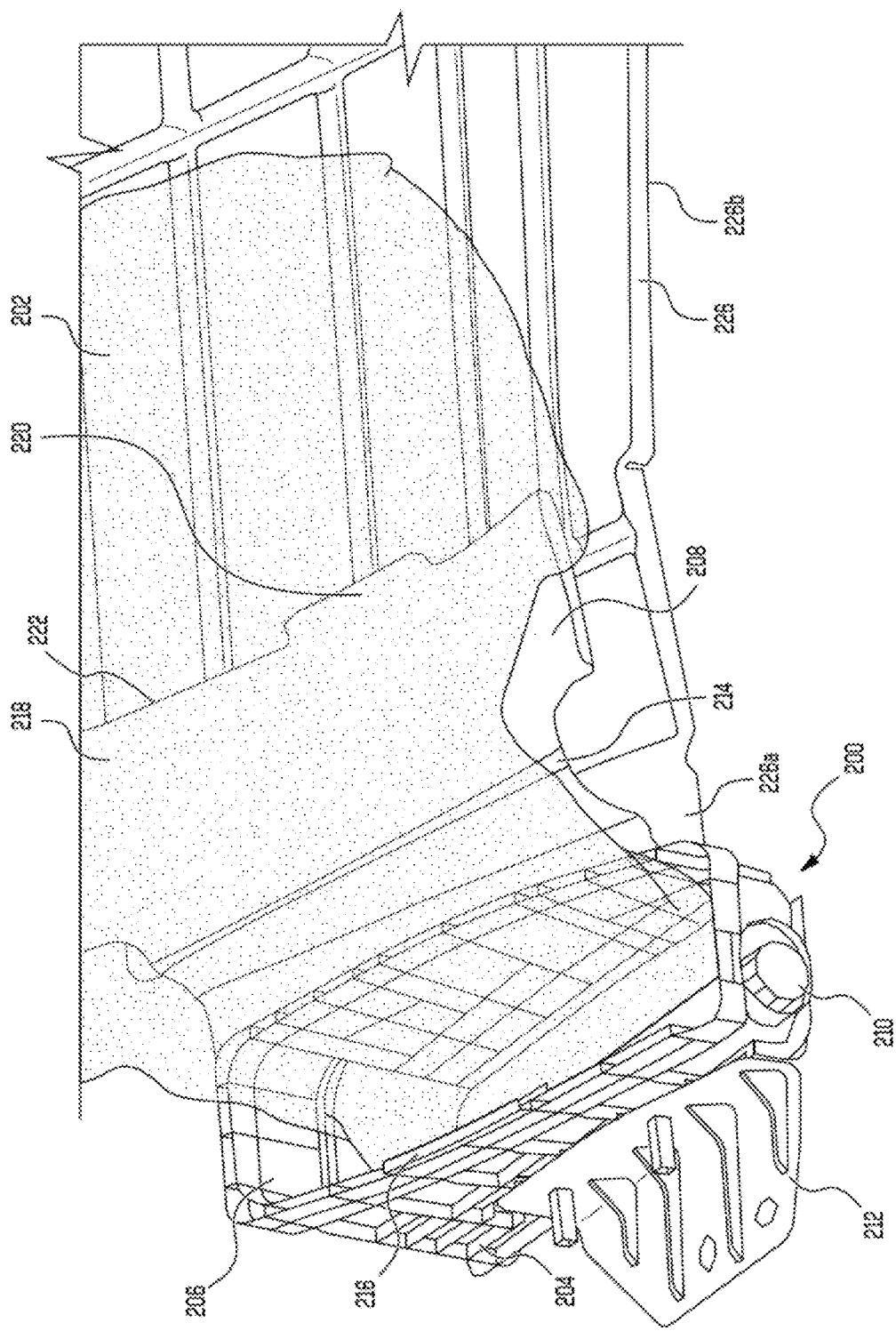
FIG. 3C is a perspective view illustrating the airbag system of FIG. 3A, with the airbag in a deployed state.

FIGS. 3A to 3C depict an example airbag system 200 at various points in time. In FIG. 3A, the airbag 202 is in a stowed state, and therefore has not been inflated or deployed. In FIG. 3B, the airbag 202 has been deployed, and is being inflated, but is not yet fully inflated. In FIG. 3C, the airbag 204 is fully inflated and is in the deployed state.

With reference to FIGS. 3A to 3C, the airbag system 200 of this example comprises a housing 204, having an opening 206. The housing 204 of this example is formed from a deformable (e.g., plastic) material, but alternative materials may be used in other examples. The housing 204 of this example has a generally cuboid shape, but the housing 204 may take alternative shapes or forms in other examples. The housing 204 may be arranged within the vehicle so that the opening 206 faces towards the passenger compartment 104, and therefore faces the exterior facing surface 153 of the back portion 152 of the seat assembly 150.

The housing 204 stores the airbag 202 when the airbag 202 is in a stowed state. The airbag may be fixed or anchored within the housing 204 so that when the airbag 202 is in the deployed state, the airbag 202 is still connected to an inside of the housing 204, and therefore extends out of the opening 206.

The housing 204 of this example also contains an inflator 210. The inflator 210 may be configured to receive a signal indicating a collision and/or an imminent collision with an object, and based on the signal, may fill the airbag 202 with a gas.

The housing 204 may be connected to one or more components of the vehicle to hold the airbag system 200 in place. For example, the housing 204 may comprise a connecting portion 212, in this case in the form of a bracket, that allows the housing 204 to be connected to a component of the vehicle, such as the body 102. One or more fixing components, such as one or more bolts, may extend through holes in the connecting portion 212 to couple fasten the housing 204 in place.

The airbag system 200 further comprises a hinged door 208. As shown in FIG. 3A, the hinged door 208 is configured to extend across the opening 206 to close the opening 206 while the airbag is in the stowed state. The airbag system 200 further comprises a hinge 214, to allow the door 208 to open. In this example, the door 208 comprises the hinge 214, and the hinge 214 is a living hinge 214. In other examples, the hinge 214 may be a separate component to which the door 208 is connected. The part of the door 208 that is adjacent to the hinge 214 may be referred to as a hinged end of the door. The door 208 rotates/pivots about a rotation axis A defined by the hinge 214.

As shown in FIG. 3B, and to a greater extent in FIG. 3C, the hinged door 208 is configured to pivot away from the opening 206 (i.e., open) due to the airbag 202 expanding to the deployed state. For example, as shown in FIG. 3B, as the airbag 202 is inflated and increases in volume, the door 208 begins to be pushed open. As shown in FIG. 3C, door 208 is hinged open when the airbag 202 is in the deployed state, thereby allowing the airbag 202 to be fully inflated.

FIGS. 3B and 3C also show how the housing 204 deforms when the airbag 202 is deployed. For example, the opening 206 widens (increases in width) due to the forces generated during deployment of the airbag 202. As shown in FIG. 3C, the opening 206 it widest at its center.

As shown most clearly in FIG. 3A, the airbag system 200 comprises a door engagement component 216 for holding and/or locking the door 208 in place with respect to the housing 204 when the door 208 is closed. In this example, the door engagement component 216 forms part of the housing 204, but in other examples, the door engagement component 216 may be separate to the housing 204. The door 208 can engage with the door engagement component 216 when the airbag 202 is in the stowed state and can be configured to disengage from the door engagement component 216 when the airbag 202 is deployed and is expanding into the deployed state. This disengagement or decoupling can be achieved because the housing 204 and/or door 208 deform or warp as a result of the forces generated during deployment of the airbag 202. In some cases, the deformation or warping is permanent, but in other cases, the housing 204 and/or door 208 may return to their previous shape once the airbag 202 has been deployed. For example, the opening 206 may return to its previous shape and size. In such examples, the airbag housing may be reused by replacing subcomponents such as, for example, the inflator, airbag, etc. without having to remove the entire system, making it easier to service, replace, etc.

In this example, the door engagement component 216 is a raised catch extending away from the opening 206. The door 208 can be received under the catch 216 in a recess defined by the catch 216. For example, a free end 218 of the door 208 may engage with the door engagement component 216. The door 208 may therefore be secured in place because the catch 216 stops the door 208 from rotating about the rotation axis A. Such a catch may be sized such that only a threshold amount of pressure applied by inflating the airbag will release the catch by plastic deformation of the door 208 and/or the housing 204. The catch 216 may also bend/pivot away from the door 208 to release the door 2008 from the catch 216. This bending or pivoting may also occur when the airbag 202 is stowed, for example to allow access behind the door 208.

In this particular example, the door 208 comprises a tab 220 protruding from an outer edge 222 of the door, where the outer edge 222 is at a free end 218 of the door 208 and is the edge that is the furthest away from the hinge 214. The tab 220 can be received in the recess of the raised catch 216, thereby securing the door 208 in place across the opening 206.

As shown in FIG. 3A, in this example, the tab 220 is arranged at the center C of the free end of the hinged door 208. In particular, the tab 220 is arranged at the center C of the outer edge 222, where the center C of the outer edge 222 is measured along a particular dimension D, in this case a length, along the outer edge 222 of the door in a direction that is parallel to the rotation axis A.

As shown in FIG. 3B, as the housing 204 and/or door 208 are deformed during the deployment of the airbag 202, the tab 220 and catch 216 are moved apart, thereby disengaging the door 208 from the catch 216. This then allows the door 208 to open and the airbag 202 to expand into the passenger compartment 104. By arranging the tab 220 at the center of the outer edge 222 of the hinged door, it is more likely that the tab 222 will disengage with the catch 216 when the airbag 202 is deployed because the housing 204 is deformed to a greater extent at its center.

As mentioned, in addition to or instead of the housing 204 being deformable, the hinged door 208 may be disengaged with the door engagement mechanism 216 by bending the door 208. A bendable door 208 is useful to allow the door 208 to be opened (by disengaging with the door engagement mechanism 216) without needing the airbag 202 to be deployed. The bending may be achieved by hand, or via a special tool. For example, a tool 224 may be inserted under the catch 216 and levered to release the tab 220 from the recess of the catch 216. Additionally, or alternatively, the door engagement mechanism 216 may bend or pivot away from the door to allow the door 208 to be opened. For example, the catch may be made of a flexible material.

As discussed earlier, in examples, the vehicle may also comprise an access panel 226 located behind the back portion 152 of the seat assembly. One or more components of the vehicle may be located behind the access panel 226, such as a fuse box. As shown in FIG. 3A, the access panel 226 and the door 208 may substantially lie in the same plane when the door 208 is in the closed position, with minimal or no spacing between the access panel 226 and the door 208. For example, as shown, one edge of the access panel 226 may be adjacent the hinge 214. The back portion 152 of the seat assembly 150 may then be positioned against the closed door 208 and the access panel 226.

As shown most clearly in FIG. 3C, the access panel 226 may have a stepped profile, with a first part 226*a* of the access panel 226 extending in a first plane, and a second part 226*b* of the access panel 226 extending in a second plane, the first and second planes being offset from each other, and with the second plane being closer to the back portion 152 than the first plane.

Figure 4A:
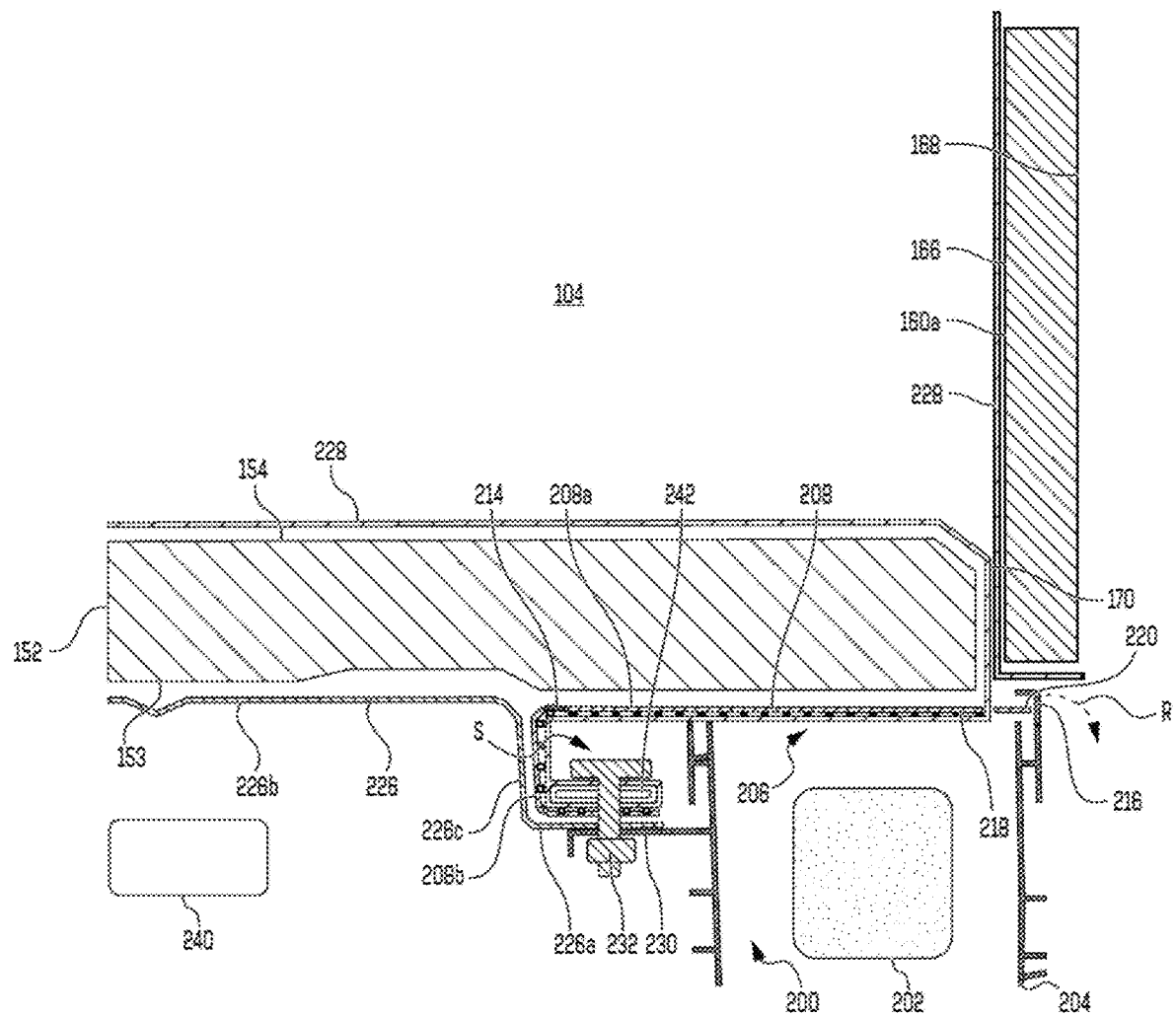
FIG. 4A is a cross-sectional view of an example airbag system and seat assembly, with the airbag in a stowed state.
Figure 4B:
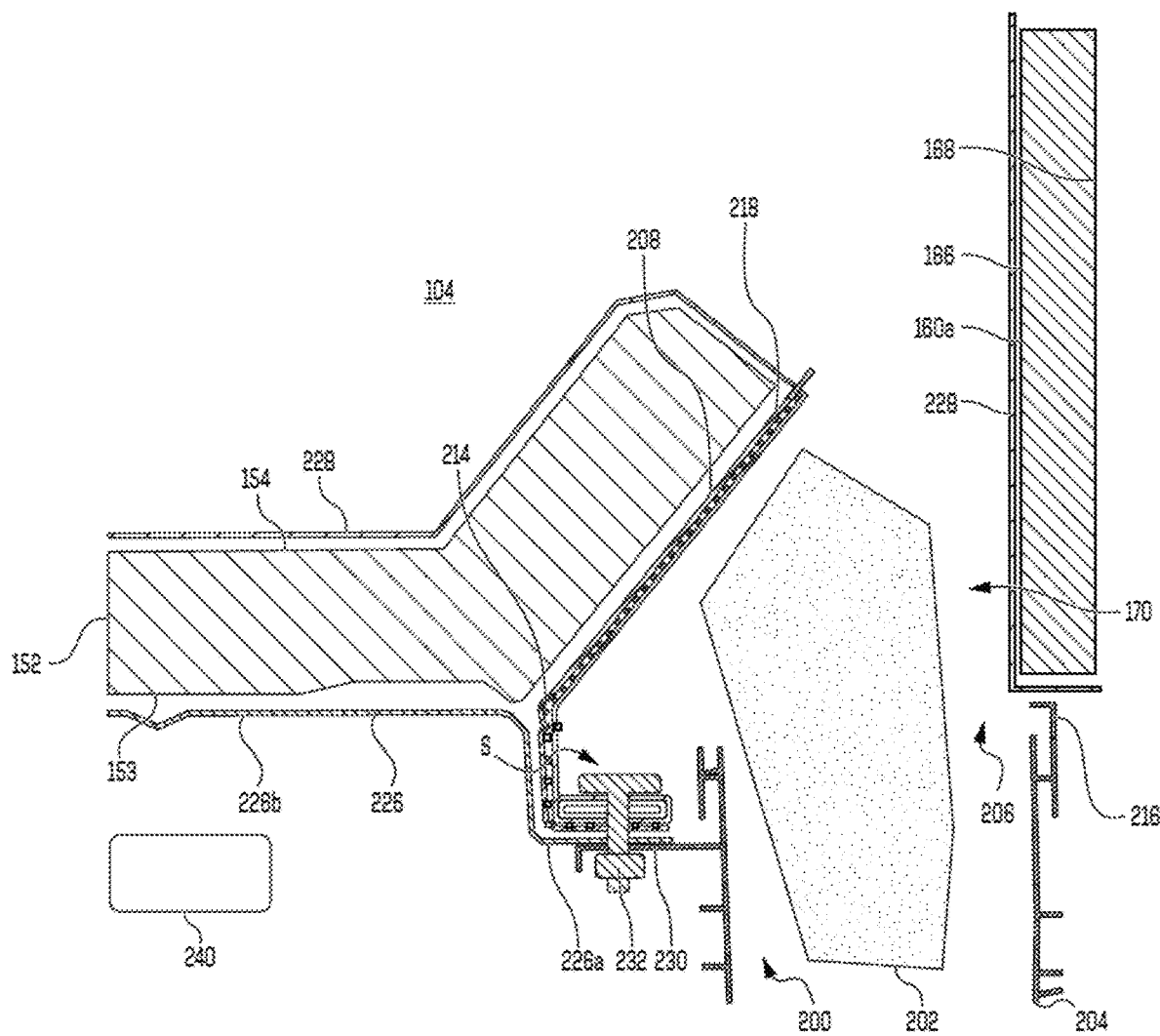
FIG. 4B is a cross-sectional view of the airbag system of FIG. 4A, with the airbag having been deployed.
Figure 4C:
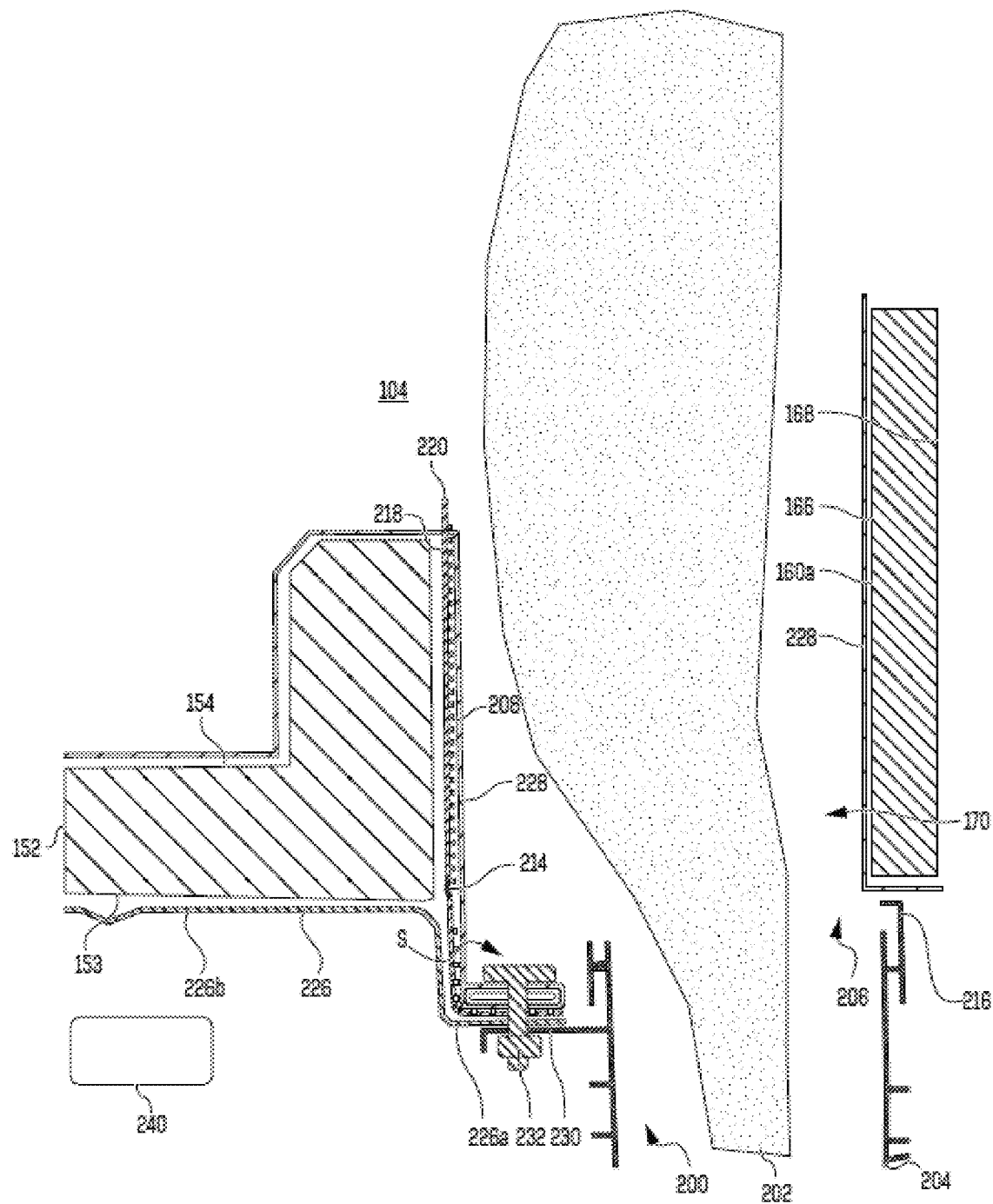
FIG. 4C is a cross-section view of the airbag system of FIG. 4A, with the airbag in a deployed state.

FIGS. 4A to 4C show a cross-section through the line B-B of part of the vehicle shown in FIG. 1, and therefore shows a cross-section of the airbag assembly 200 and seat assembly 150. As in FIGS. 3A to 3C, FIGS. 4A to 4C depict the example airbag system 200 at various points in time. In FIG. 4A, the airbag 202 is in a stowed state, and therefore has not been inflated or deployed. In FIG. 4B, the airbag 202 has been deployed, and is being inflated, but is not yet fully inflated. In FIG. 4C, the airbag 204 is fully inflated and is in the deployed state.

FIG. 4A shows more clearly the tab 220 located at the outer edge of the hinged door 208 positioned within the recess formed by the raised catch 216 that protrudes outwards from the opening of the housing 204. The free end 218 of the door 208, and therefore the tab 220, are located adjacent to the gap 170 that extends between the back portion 152 and the side portion 160*a*. The hinge 214 is located at the opposite end of the door 208, and so the door 208 hinges away from the gap 170.

FIG. 4A also shows more clearly the stepped profile of the access panel 226.

As mentioned, the catch 216 may be configured to pivot away from the door 208 or opening 206, as indicated by the arrow R.

In addition to the components described above, FIGS. 4A to 4C further show a seat trim 228 covering the back portion 152 of the seat assembly 150. In this example, the seat trim 228 also covers the side portion 160*a*, but in other examples, the seat trim 228 may only cover the back portion 152.

As shown in FIG. 4A, the housing 104 may comprise a connecting portion 230 to which the door 208 and/or the access panel 226 may be connected. As mentioned, the connecting portion 230 may be a protruding portion that extends away from the housing 204. In this example, the connecting portion 230 extends away from the housing 204 to define a connecting surface, where the connecting surface is parallel to, but offset from, the hinged door 208 when the door 208 is closing the opening 206.

In this example, both the door 208 and access panel 226 are connected to the connecting portion 230 via a fixing component 232, in this case a bolt. By disconnecting the fixing component 232, the access panel 226 may be removed or opened. This may be required, for example, to access components positioned behind the access panel 226, such as a fuse box 240. FIG. 4A shows the first part 226a of the access panel 226 being connected to the connecting portion 230 of the housing 204.

To reduce the likelihood of a passenger opening the access panel 226, the fixing component 232 is located behind the door 208, meaning that the door 208 needs to be opened to access the fixing component 232. In this particular example, the door 208 must first be disengaged with the door engagement component 216 before the fixing component 232 can be accessed.

As shown in FIG. 4A, while the door 208 is in the closed position and extends across the opening 206, a portion 208a of the hinged door 208 extends beyond the opening 206, and the fixing component 232 is positioned behind the portion 208a of the hinged door 208 with respect to the passenger compartment 104.

As shown in FIG. 4A, to enable the fixing component 232 to be positioned behind the closed door, and to provide a continuous flat surface against which the back portion 152 rests (by ensuring the access panel 226 and closed door 208 lie in the same plane, with no or a minimal gap between them), the hinged door 208 has a U-shaped cross section, and the access panel has a stepped profile. Connecting the access panel 226 and door 208 in this way has been found to reduce the likelihood of the door from detaching from the housing 204 when the airbag 202 is deployed. As shown, a bottom end 208b of the U-shape of the door abuts the stepped part 226c of the access panel 226 that connects the first and second parts 226a, 226b of the access panel 226. The stepped part 226c may be substantially perpendicular to the first and second parts 226a, 226b The door 208 therefore extends beyond the opening and has a U-shaped cross-section at an exterior of the housing 204 when the door 208 extends across the opening of the housing. The door 208 therefore is "bent" between the opening 206 and the connecting portion 230 to have the U-shaped cross-section. As shown, the fixing component 232 extends into a space S between the door 208 and the connecting portion 230, and so is accessible when the door 208 pivots away from the opening 206 (i.e., when the door 208 is open).

FIG. 4A also shows the seat trim 228 that covers the back portion 152 of the seat assembly extending along the door 208 on an inner surface thereof. Part of the seat trim 228 therefore faces into the housing 204 when the door 208 is in the closed position. The door is therefore partially inside the back portion 152, due to being encapsulated by the seat trim 228. In some examples, the tab 220 may extend through a hole in the seat trim 228, rather than being covered by the seat trim 228.

FIG. 4A also shows the seat trim 228 being connected to the connecting portion 230 via the fixing component 232. In this example, this is achieved by wrapping the seat trim 228 around a rigid component, where the rigid component is coupled to the fixing component 232. In this case, the rigid component is an aluminum plate 242, and a pocket is formed in the seat trim 228 within which the aluminum plate 242 resides.

On an inner surface of the door 208 (that is, the surface that faces into the housing 204, the seat trim 228 may be attached to the door, such as via an adhesive, stitching, etc.

As shown in FIGS. 4B and 4C, the seat trim 228 and back portion 152 both move with the door 208, as the door 208 is opened during deployment of the airbag 202.

FIG. 4B, for example, shows the airbag 202 expanding in size and extending out of the opening 206. The force generated during deployment of the airbag 202 causes the door 208 to open, effectively increasing the size of the gap 170 between the back portion 152 and the side portion 160a of the seat assembly 150. The back portion 152 may be made of resilient material that can deform in shape. For example, the back portion 152 may be made of a foam material that can bend as the door 208 is opened.

FIG. 4C shows the airbag 202 fully deployed and therefore in the deployed state. The airbag 202 extends out of the housing 204 and along the interior facing surface 166 of the side portion 160a. As shown, the fixing component 232 may be accessed once the door 208 is in the open position. It will be understood that in some cases, the door 208 may be opened while the airbag 202 is in the stowed state.

Figure 5A:
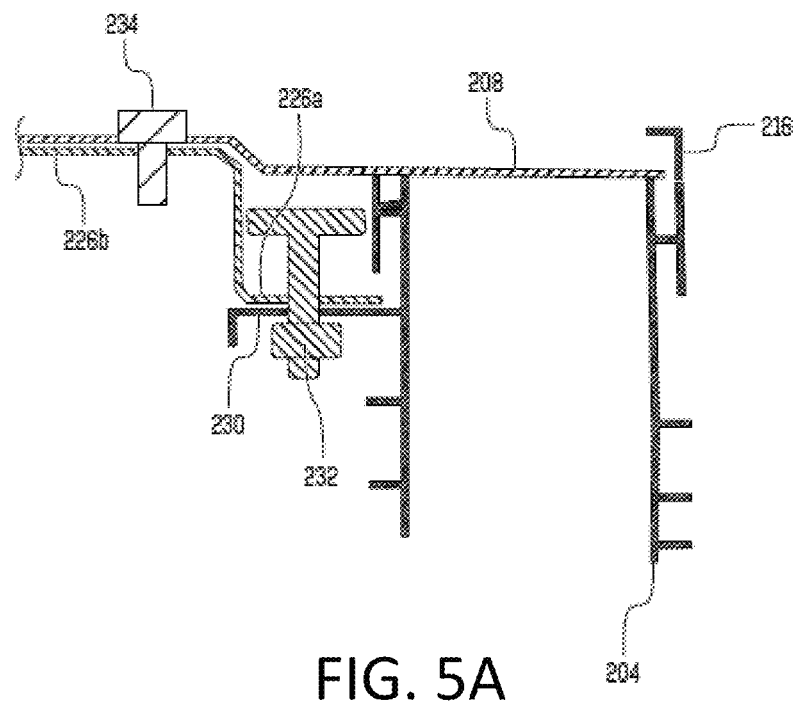
FIG. 5A is a cross-sectional view of alternative arrangement of the example airbag system and seat assembly, with the airbag in a stowed state.

As discussed above with reference to FIGS. 4A to 4C, the door 208 and access panel 226 may be connected via the same fixing component 232 or at least be connected to the same element, in this case the connecting portion 230 of the housing 204. In an alternative example, however, the access panel 226 may be connected to the housing 204 in the same way as in FIGS. 4A to 4C, but the hinged door 208 may instead be connected to the access panel 226 at a different position, via a second fixing component 234. An example of this alternative configuration is shown in FIG. 5A, where the hinged door 208 is connected to the second part 226b of the access panel, rather than the first part 226a, as in FIGS. 4A to 4C. Although this configuration requires an additional fixing component 234, the configuration is useful because the fixing component 232 for the access panel 226 is still obscured behind the door 208, and because there is no gap or spacing between the access panel 226 and the door 208, resulting in a substantially flat surface against which the back portion 152 may rest.

Figure 5B:
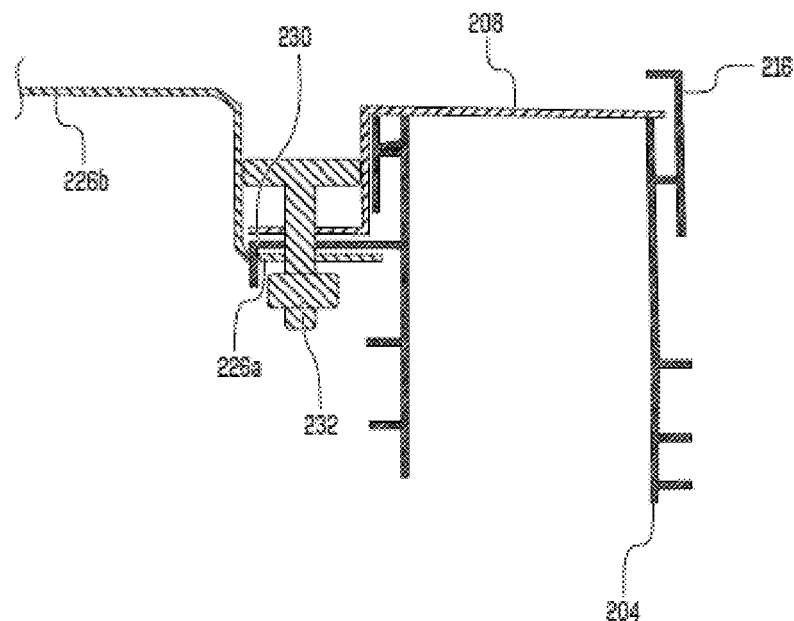
FIG. 5B is a cross-sectional view of further alternative arrangement of the example airbag system and seat assembly, with the airbag in a stowed state.

Additionally, or alternatively, the door 208 and access panel 226 may be connected via the same fixing component 232, as in the example of FIGS. 4A to 4C, but rather than placing the fixing component 232 behind the door 208, the door 208 may have a stepped profile like the access panel 226. This configuration is shown in FIG. 5B. Although this configuration may mean that there is a non-continuous surface against which the back portion 152 may rest, this configuration may still be useful, because fewer connecting points and/or fixing components are needed (in contrast to the example of FIG. 5A, for example).

Figure 6A:
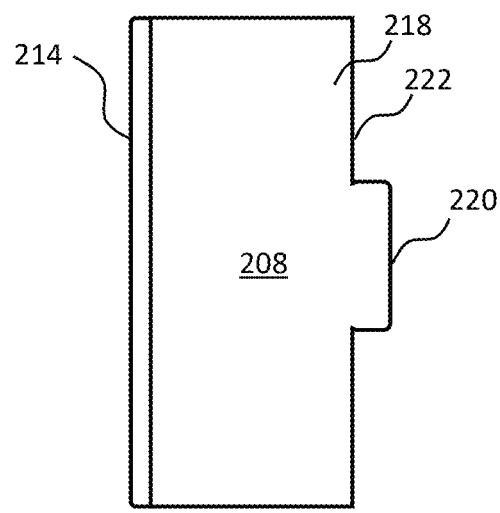
FIG. 6A is a schematic illustration of an example hinged door with a tab.
Figure 6B:
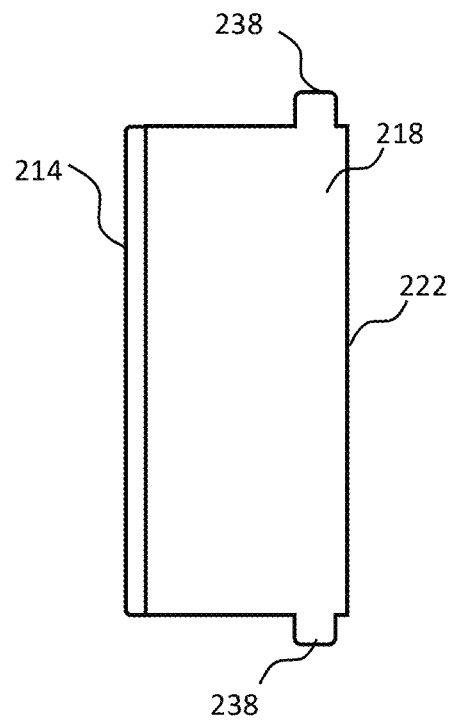
FIG. 6B is a schematic illustration of an example hinged door with two tabs.

As discussed above, in examples, the door 208 may comprise a tab 220 arranged at the center of the outer edge 222 of the door 208. This configuration is shown in FIG. 6A. Alternatively, or additionally, another part of the free end 218 of the door 208 may engage with the one or more door engagement components. For example, as shown in FIG. 6B, at the free end 218 of the door 208, there may be one or more tabs 238 located on one or more adjacent edges 236a, 236b, of the door 208, rather than the outer edge 222 of the door 208. Each tab 238 may engage with a separate door engagement component (not shown in FIG. 6B).

Figure 7:
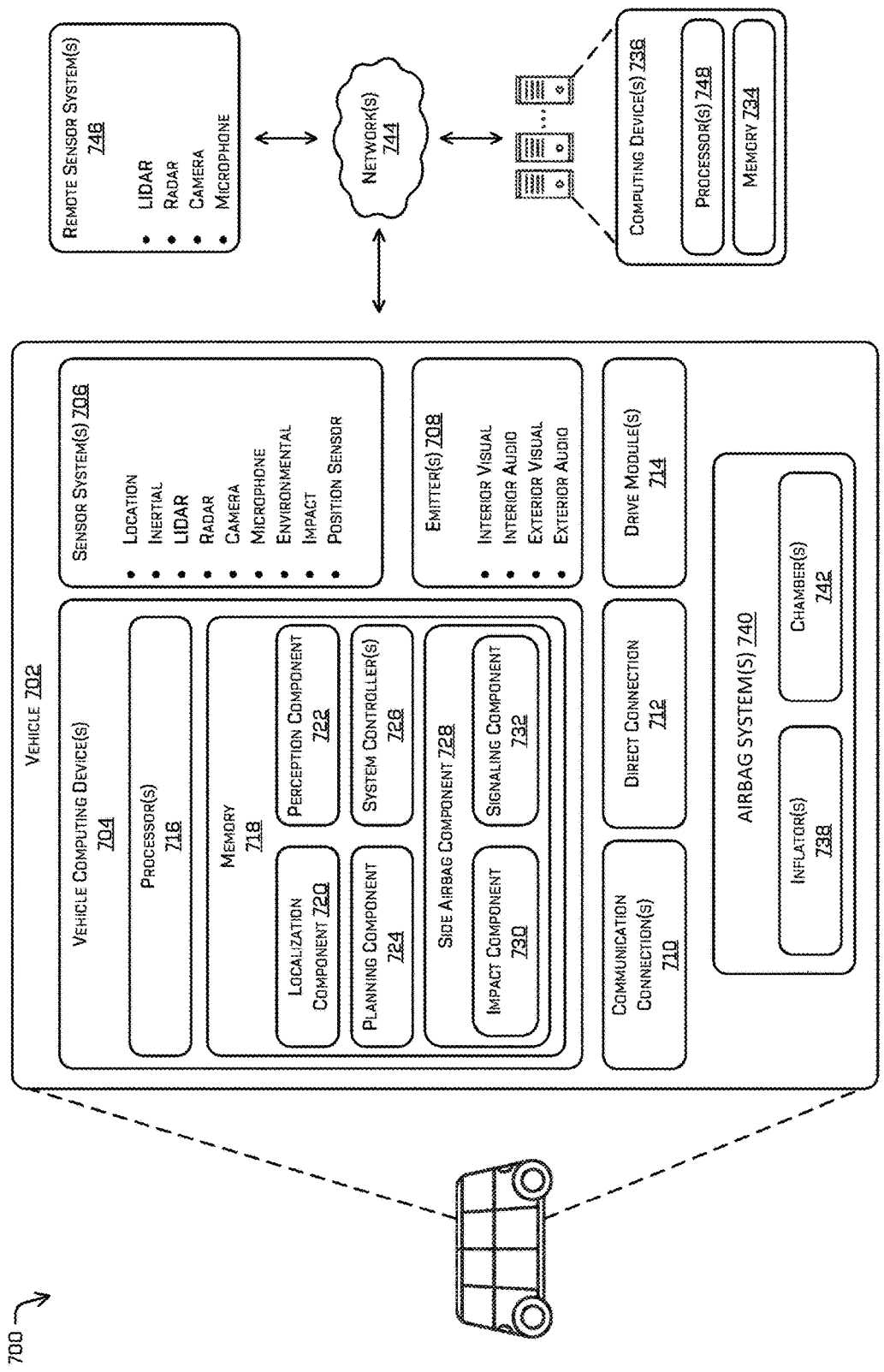
FIG. 7 is a block diagram of an example vehicle system.

FIG. 7 is a block diagram of an example system 700 for implementing the techniques described herein. In at least one example, the system 700 may include a vehicle 702, such as the vehicle in which a seat assembly 150 may be mounted as described above with regard to FIGS. 1-6B.

The vehicle 702 may include a vehicle computing device 704, one or more sensor systems 706, one or more emitters 708, one or more communication connections 710, at least one direct connection 712, and one or more drive modules 714.

The vehicle computing device 704 may include one or more processors 716 and memory 718 communicatively coupled with the one or more processors 716. The vehicle 702 may include any type of vehicle, such as an autonomous vehicle, a semi-autonomous vehicle, or any other system having at least an image capture device (e.g., a camera enabled smartphone). In the illustrated example, the memory 718 of the vehicle computing device 704 stores a localization component 720, a perception component 722, a planning component 724, one or more system controllers 726, and an airbag component 728, such as a side airbag component 728, including an impact component 730, and a signaling component 732. Though depicted in FIG. 7 as residing in the memory 718 for illustrative purposes, it is contemplated that the localization component 720, the perception component 722, the planning component 724, the system controllers 726, and the side airbag component 728 including the impact component 730, and the signaling component 732 may additionally, or alternatively, be accessible to the vehicle 702 (e.g., stored on, or otherwise accessible by, memory remote from the vehicle 702, such as, for example, on memory 734 of a remote computing device 736).

In at least one example, the localization component 720 may include functionality to receive data from the sensor system(s) 706 to determine a position and/or orientation of the vehicle 702 (e.g., one or more of an x-, y-, z-position, roll, pitch, or yaw). For example, the localization component 720 may include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, LIDAR data, radar data, IMU data, GPS data, wheel encoder data, and the like to accurately determine a location of the autonomous vehicle. In some instances, the localization component 720 can provide data to various components of the vehicle 702 to determine an initial position of a vehicle for determining whether an impact, such as a side impact, with an object may occur (e.g., imminent impact), as discussed herein.

In some examples, the perception component 722 may include functionality to perform object detection, segmentation, and/or classification. In some examples, the perception component 722 may provide processed sensor data that indicates a presence of an object that is proximate to the vehicle 702 and/or a classification of the object as an object type (e.g., car, pedestrian, cyclist, animal, building, tree, road surface, curb, sidewalk, unknown, etc.). In some examples, the perception component 722 may provide processed sensor data that indicates a presence of a stationary object that is proximate to the vehicle 702 and/or a classification of the stationary object as a type (e.g., building, tree, road surface, pole, curb, sidewalk, unknown, etc.). In additional or alternative examples, the perception component 722 may provide processed sensor data that indicates one or more characteristics associated with a detected object (e.g., a tracked object) and/or the environment in which the object is positioned. In some examples, characteristics associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 724 may determine a path for the vehicle 702 to follow to traverse through an environment. For example, the planning component 724 may determine various routes and trajectories and various levels of detail. For example, the planning component 724 may determine a route to travel from a first location (e.g., a current location) to a second location (e.g., a target location). For the purpose of this discussion, a route may include a sequence of waypoints for travelling between two locations. As non-limiting examples, waypoints include streets, intersections, global positioning system (GPS) coordinates, etc. Further, the planning component 724 may generate an instruction for guiding the autonomous vehicle along at least a portion of the route from the first location to the second location. In at least one example, the planning component 724 may determine how to guide the vehicle 702 from a first waypoint in the sequence of waypoints to a second waypoint in the sequence of waypoints. In some examples, the instruction can be a trajectory, or a portion of a trajectory. In some examples, multiple trajectories may be substantially simultaneously generated (e.g., within technical tolerances) in accordance with a receding horizon technique, wherein one of the multiple trajectories is selected for the vehicle 702 to navigate.

In some examples, the planning component 724 may include a prediction component to generate predicted trajectories of objects in an environment. For example, a prediction component may generate one or more predicted trajectories for objects within a threshold distance from the vehicle 702. In some examples, a prediction component may measure a trace of an object and generate a trajectory for the object based on observed and predicted behavior.

In at least one example, the vehicle computing device 704 may include one or more system controllers 726, which may be configured to control steering, propulsion, braking, safety, emitters, communication, and other systems of the vehicle 702. The system controller(s) 726 may communicate with and/or control corresponding systems of the drive module(s) 714 and/or other components of the vehicle 702.

As illustrated in FIG. 7, the vehicle computing device 704 may include an airbag component 728, such as a side airbag component 728. The side airbag component 728 may include an impact component 730 configured to determine an imminent impact (e.g., frontal impact, side impact, glancing impact, etc.) with an object. In various examples, side airbag component 728 may receive data from the perception component 722 regarding one or more objects in an environment. The data may include a trajectory of the object(s), speed of the object(s) to include a closing speed (e.g., closure rate), acceleration of the object(s), a bearing from the vehicle 702 to the object, and/or any other data to assist the impact component 730 in determining that an impact with an object is imminent.

In various examples, the impact component 730 may be configured to determine a time associated with the imminent impact. The time may be a particular time, such as, for example, 120 milliseconds after 3:05 pm, or it may be a time interval from a time in which imminent impact was determined. The time may be determined based on a measured closure rate of the object toward the vehicle 702, a velocity of the vehicle 702, an acceleration of the vehicle 702, a velocity of the object, an acceleration of the object, road conditions, weather conditions, and/or other factors that may affect a closure rate of an object toward a vehicle or vice versa.

In some examples, the side airbag component 728 may include a signaling component 732. The signaling component 732 may be configured to receive an indication of imminent impact with an object, such as from the impact component 730, and send a signal to one or more inflators 738 of one or more airbags systems 740, which may include an airbag/chamber 742, such as airbag 202. In various examples, the signal may cause an inflator 738 to expel gas into an airbag/chamber 742 of an airbag system 740, upon receipt of the signal. In some examples, the signal may include a timing component. In such examples, the signal may cause the inflator 738 to expel gas into an airbag/chamber 742 of the airbag system 740 at a particular time and/or after an indicated period of time (e.g., delay period). For example, the signaling component 732 may receive a time associated with the imminent impact from the impact component 730. The signaling component 732 may include the time in the signal, thereby causing the airbag/chamber 742 to deploy upon impact. For another example, the signaling component 732 may include a delay period, thereby causing the airbag/chamber 742 to deploy after the delay period. Responsive to receiving the signal, the inflator 738 may cause the airbag/chamber 742 to deploy toward a passenger seated in a passenger compartment of the vehicle 702.

As can be understood, the components discussed herein (e.g., the localization component 720, the perception component 722, the planning component 724, the one or more system controllers 726, the airbag component 728 including the impact component 730, and the signaling component 732 are described as divided for illustrative purposes. However, the operations performed by the various components can be combined or performed in any other component.

In some instances, aspects of some or all of the components discussed herein can include any models, algorithms, and/or machine learning algorithms. For example, in some instances, the components in the memory 718 (and the memory 734, discussed below) can be implemented as a neural network.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

In at least one example, the sensor system(s) 706 may include LIDAR sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. In various examples, the sensor system(s) 706 may include a position sensor configured to determine whether a passenger is seated in a seat assembly. In some examples, the position sensor may include a weight switch configured to determine whether a weight is located on the seat assembly. The weight may include a minimum weight associated with a passenger (e.g., 50 pounds, 25 kilograms, 100 pounds, etc.). In various examples, the position sensor may include an image capture device and/or other perception sensor. In such examples, the image capture device and/or other perception sensor may send sensor data to the vehicle computing device to analyze and determine whether the object in the seat assembly is a passenger (e.g., whether it is a human or other live animal).

The sensor system(s) 706 can include multiple instances of each of these or other types of sensors. For instance, the LIDAR sensors can include individual LIDAR sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device 704. Additionally or alternatively, the sensor system(s) 706 may send sensor data, via the one or more networks 744, to the one or more computing device(s) 736 at a particular frequency, after a lapse of a predetermined period of time, in near real-time, etc.

The vehicle 702 may also include one or more emitters 708 for emitting light and/or sound, as described above. The emitters 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 may also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive module(s) 714. Also, the communication connection(s) 710 can allow the vehicle to communicate with other nearby computing device(s) (e.g., computing device(s) 736, other nearby vehicles, etc.) and/or one or more remote sensor system(s) 746 for receiving sensor data.

The communications connection(s) 710 may include physical and/or logical interfaces for connecting the vehicle computing device 704 to another computing device or a network, such as network(s) 744. For example, the communications connection(s) 710 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 702 may include one or more drive modules 714. In some examples, the vehicle 702 can have a single drive module 714. In at least one example, if the vehicle 702 has multiple drive modules 714, individual drive modules 714 may be positioned on opposite ends of the vehicle 702 (e.g., the front and the rear, etc.). In at least one example, the drive module(s) 714 may include one or more sensor systems to detect conditions of the drive module(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, radar sensors, etc. Some sensors, such as the wheel encoders can be unique to the drive module(s) 714. In some cases, the sensor system(s) on the drive module(s) 714 can overlap or supplement corresponding systems of the vehicle 702 (e.g., sensor system(s) 706).

The drive module(s) 714 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 714 may include a drive module controller which can receive and preprocess data from the sensor system(s) and to control operation of the various vehicle systems. In some examples, the drive module controller can include one or more processors and memory communicatively coupled with the one or more processors. The memory can store one or more modules to perform various functionalities of the drive module(s) 714. Furthermore, the drive module(s) 714 may also include one or more communication connection(s) that enable communication by the respective drive module with one or more other local or remote computing device(s).

In at least one example, the direct connection 712 may provide a physical interface to couple the one or more drive module(s) 714 with the body of the vehicle 702. For example, the direct connection 712 may allow the transfer of energy, fluids, air, data, etc. between the drive module(s) 714 and the vehicle. In some instances, the direct connection 712 can further releasably secure the drive module(s) 714 to the body of the vehicle 702.

In at least one example, the localization component 720, the perception component 722, the planning component 724, the one or more system controllers 726, and the airbag component 728 and various components thereof, may process sensor data, as described above, and may send their respective outputs, over the one or more network(s) 744, to the computing device(s) 736. In at least one example, the localization component 720, the perception component 722, the planning component 724, the one or more system controllers 726, and the airbag component 728 may send their respective outputs to the computing device(s) 736 at a particular frequency, after a lapse of a predetermined period of time, in near real-time, etc.

In some examples, the vehicle 702 may send sensor data to the computing device(s) 736 via the network(s) 744. In some examples, the vehicle 702 may receive sensor data from the computing device(s) 736 and/or from remote sensor systems 746 via the network(s) 744. The sensor data may include raw sensor data and/or processed sensor data and/or representations of sensor data. In some examples, the sensor data (raw or processed) may be sent and/or received as one or more log files.

The computing device(s) 736 may include processor(s) 748 and a memory 734 configured to store data. The processor(s) 716 of the vehicle 702 and the processor(s) 748 of the computing device(s) 736 may be any suitable processor capable of executing instructions to process data and perform operations as described herein. By way of example and not limitation, the processor(s) 716 and 748 may comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 734 are examples of non-transitory computer-readable media. The memory 718 and 734 may store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some instances, the memory 718 and 734 may include at least a working memory and a storage memory. For example, the working memory may be a high-speed memory of limited capacity (e.g., cache memory) that is used for storing data to be operated on by the processor(s) 716 and 748. In some instances, the memory 718 and 734 may include a storage memory that may be a lower-speed memory of relatively large capacity that is used for long-term storage of data. In some cases, the processor(s) 716 and 748 cannot operate directly on data that is stored in the storage memory, and data may need to be loaded into a working memory for performing operations based on the data, as discussed herein.

It should be noted that while FIG. 7 is illustrated as a distributed system, in alternative examples, components of the vehicle 702 may be associated with the computing device(s) 736 and/or components of the computing device(s) 736 may be associated with the vehicle 702. That is, the vehicle 702 may perform one or more of the functions associated with the computing device(s) 736, and vice versa.

EXAMPLE CLAUSES

1. A vehicle, comprising: a body defining a passenger compartment; a seat assembly comprising a back portion; and an airbag system positioned behind the back portion relative to the passenger compartment, and comprising: a housing comprising an opening and a door engagement component; an airbag, configured to expand from a stowed state to a deployed state in response to a trigger, wherein the airbag: (i) is located inside the housing while in the stowed state, and (ii) extends out of the opening while expanding to the deployed state; and a hinged door comprising a free end, wherein the free end is configured to: engage with the door engagement component while the airbag is in the stowed state, such that the hinged door extends across the opening to close the opening; and disengage with the door engagement component and pivot away from the opening due to the airbag expanding to the deployed state.
2. The vehicle of clause 1, wherein the hinged door comprises a living hinge.
3. The vehicle of clause 1 or 2, wherein: the back portion is positioned to face towards the passenger compartment; the seat assembly comprises an access panel positioned behind the back portion with respect to the passenger compartment; the vehicle comprises a fixing component configured to releasably fix the access panel in place within the vehicle; a portion of the hinged door extends beyond the opening when the hinged door closes the opening; and the fixing component is positioned behind the portion of the hinged door with respect to the passenger compartment when the hinged door closes the opening.
4. The vehicle of clause 3, wherein the fixing component is configured to connect the hinged door to the access panel.
5. The vehicle of clause 4, wherein the fixing component is configured to connect the access panel and the hinged door to a connecting portion of the housing.
6. The vehicle of any of clauses 1 to 5, wherein the seat assembly comprises a seat trim, wherein the seat trim covers at least part of the back portion and encapsulates at least part of the hinged door, such that the hinged door is between the back portion and the seat trim.
7. The vehicle of clause 6, wherein a first region of the seat trim covering the back portion comprises a first material and a second region of the seat trim covering the hinged door comprises a second material, the second material having a lower surface roughness than the first material.
8. The vehicle of any of clauses 1 to 7, wherein the seat assembly comprises a side portion arranged adjacent to the back portion, wherein the free end of the hinged door is arranged relative to the side portion and back portion such that when the hinged door pivots away from the opening due to the airbag expanding to the deployed state, the airbag and hinged door cause the back portion to move relative to the side portion to increase a size of a gap between the back portion and the side portion, through which the airbag can pass.
9. A vehicle airbag system, comprising: a housing comprising an opening; an airbag, configured to expand from a stowed state to a deployed state in response to a trigger, wherein the airbag: (i) is located inside the housing while in the stowed state, and (ii) extends out of the opening while expanding to the deployed state; and a hinged door, configured to: extend across the opening to close the opening while the airbag is in the stowed state; and pivot away from the opening due to the airbag expanding to the deployed state.
10. The vehicle airbag system of clause 9, comprising a door engagement component, wherein the hinged door is configured to: engage with the door engagement component when closing the opening; and disengage with the door engagement component due to the airbag expanding to the deployed state.
11. The vehicle airbag system of clause 10, wherein the hinged door is bendable such that the hinged door can be engaged and disengaged with the door engagement component while the airbag is in the stowed state.
12. The vehicle airbag system of clause 11, comprising a tool configured to cause the hinged door to bend.
13. The vehicle airbag system of any of clauses 10 to 12, wherein the housing is deformable upon exertion of a force by the airbag during expansion into the deployed state, and wherein the hinged door is configured to disengage with the door engagement component due to a change in shape of the opening when the housing deforms.
14. The vehicle airbag system of clause 13, wherein the housing comprises the door engagement component, and wherein the door engagement component comprises a raised catch extending away from the opening and defining a recess configured to receive the hinged door.
15. The vehicle airbag system of clause 14, wherein the raised catch is configured to pivot away from the opening.
16. The vehicle airbag system of clause 14 or 15, wherein a free end of the hinged door comprises a tab, and wherein the tab is configured to be received in the recess defined by the raised catch.

17. The vehicle airbag system of clause 15 or 16, wherein the tab is arranged at or near to the center of the free end of the hinged door.
18. The vehicle airbag system of clause 9, comprising a fixing component configured to connect the hinged door to a connecting portion of housing.
19. The vehicle airbag system of clause 18, wherein: the hinged door extends beyond the opening and has a U-shaped cross-section at an exterior of the housing when the hinged door extends across the opening of the housing; and the fixing component extends into a space defined by the U-shaped cross-section and is accessible when the hinged door pivots away from the opening.
20. A vehicle, comprising: a body defining a passenger compartment; a seat assembly comprising a back portion; and an airbag system positioned behind the back portion relative to the passenger compartment, and comprising: a housing comprising an opening; an airbag, configured to expand from a stowed state to a deployed state in response to a trigger, wherein the airbag: (i) is located inside the housing while in the stowed state, and (ii) extends out of the opening while expanding to the deployed state; and a hinged door, configured to: extend across the opening to close the opening while the airbag is in the stowed state; and pivot away from the opening due to the airbag expanding to the deployed state.
21. A vehicle airbag system, comprising: an airbag system comprising: a housing comprising an opening and a door engagement component; an airbag, configured to expand from a stowed state to a deployed state in response to a trigger, wherein the airbag: (i) is located inside the housing while in the stowed state, and (ii) extends out of the opening while expanding to the deployed state; and a hinged door comprising a free end, wherein the free end is configured to: engage with the door engagement component while the airbag is in the stowed state, such that the hinged door extends across the opening to close the opening; and disengage with the door engagement component and pivot away from the opening due to the airbag expanding to the deployed state.

While the example clauses described above are described with respect to one particular implementation, it should be understood that, in the context of this document, the content of the example clauses can also be implemented via a method, device, system, computer-readable medium, and/or another implementation. Additionally, any of example clauses 1-21 may be implemented alone or in combination with any other one or more of the example clauses.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub computations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

It will be appreciated that throughout this disclosure, any reference to an aspect being based on another aspect, may mean that the aspect is based at least in part on the other aspect.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A vehicle, comprising:
 a body defining a passenger compartment;
 a seat assembly comprising a backrest portion; and
 an airbag system positioned behind the backrest portion relative to the passenger compartment, and comprising:
  a housing comprising an opening and a door engagement component;
  an airbag, configured to expand from a stowed state to a deployed state in response to a trigger, wherein the airbag: (i) is located inside the housing while in the stowed state, and (ii) extends out of the opening while expanding to the deployed state; and
  a hinged door comprising a free end, wherein the free end is configured to:
   engage with the door engagement component while the airbag is in the stowed state, such that the hinged door extends across the opening to close the opening; and
   disengage with the door engagement component and pivot away from the opening due to the airbag expanding to the deployed state.

2. The vehicle of claim 1, wherein the hinged door comprises a living hinge.

3. The vehicle of claim 1, wherein:
 the backrest portion is positioned to face towards the passenger compartment;
 the seat assembly comprises an access panel positioned behind the backrest portion with respect to the passenger compartment;
 the vehicle comprises a fixing component configured to releasably fix the access panel in place within the vehicle;
 a portion of the hinged door extends beyond the opening when the hinged door closes the opening; and
 the fixing component is positioned behind the portion of the hinged door with respect to the passenger compartment when the hinged door closes the opening.

4. The vehicle of claim 3, wherein the fixing component is configured to connect the hinged door to the access panel.

5. The vehicle of claim 4, wherein the fixing component is configured to connect the access panel and the hinged door to a connecting portion of the housing.

6. The vehicle of claim 1, wherein the seat assembly comprises a seat trim, wherein the seat trim covers at least part of the backrest portion and encapsulates at least part of the hinged door, such that the hinged door is between the backrest portion and the seat trim.

7. The vehicle of claim 6, wherein a first region of the seat trim covering the backrest portion comprises a first material and a second region of the seat trim covering the hinged door comprises a second material, the second material having a lower surface roughness than the first material.

8. The vehicle of claim 1, wherein the seat assembly comprises a side portion arranged adjacent to the backrest portion, wherein the free end of the hinged door is arranged relative to the side portion and backrest portion such that when the hinged door pivots away from the opening due to the airbag expanding to the deployed state, the airbag and hinged door cause the backrest portion to move relative to the side portion to increase a size of a gap between the backrest portion and the side portion, through which the airbag can pass.

9. A vehicle airbag system, comprising:
 a housing comprising an opening;
 an airbag, configured to expand from a stowed state behind a backrest portion of a seat assembly to a deployed state in response to a trigger, wherein the airbag: (i) is located inside the housing while in the stowed state, and (ii) extends out of the opening while expanding to the deployed state; and
 a hinged door, configured to:
  extend across the opening to close the opening while the airbag is in the stowed state; and
  pivot away from the opening due to the airbag expanding to the deployed state.

10. The vehicle airbag system of claim 9, comprising a door engagement component, wherein the hinged door is configured to:
 engage with the door engagement component when closing the opening; and
 disengage with the door engagement component due to the airbag expanding to the deployed state.

11. The vehicle airbag system of claim 10, wherein the hinged door is bendable such that the hinged door can be engaged and disengaged with the door engagement component while the airbag is in the stowed state.

12. The vehicle airbag system of claim 11, comprising a tool configured to cause the hinged door to bend.

13. The vehicle airbag system of claim 10, wherein the housing is deformable upon exertion of a force by the airbag during expansion into the deployed state, and wherein the hinged door is configured to disengage with the door engagement component due to a change in shape of the opening when the housing deforms.

14. The vehicle airbag system of claim 13, wherein the housing comprises the door engagement component, and wherein the door engagement component comprises a raised catch extending away from the opening and defining a recess configured to receive the hinged door.

15. The vehicle airbag system of claim 14, wherein the raised catch is configured to pivot away from the opening.

16. The vehicle airbag system of claim 14, wherein a free end of the hinged door comprises a tab, and wherein the tab is configured to be received in the recess defined by the raised catch.

17. The vehicle airbag system of claim 16, wherein the tab is arranged at or near to the center of the free end of the hinged door.

18. The vehicle airbag system of claim 9, comprising a fixing component configured to connect the hinged door to a connecting portion of housing.

19. The vehicle airbag system of claim 18, wherein:
the hinged door extends beyond the opening and has a U-shaped cross-section at an exterior of the housing when the hinged door extends across the opening of the housing; and
the fixing component extends into a space defined by the U-shaped cross-section and is accessible when the hinged door pivots away from the opening.

20. A vehicle, comprising:
a body defining a passenger compartment;
a seat assembly comprising a backrest portion; and
an airbag system positioned behind the backrest portion relative to the passenger compartment, and comprising:
  a housing comprising an opening;
  an airbag, configured to expand from a stowed state to a deployed state in response to a trigger, wherein the airbag: (i) is located inside the housing while in the stowed state, and (ii) extends out of the opening while expanding to the deployed state; and
  a hinged door, configured to:
    extend across the opening to close the opening while the airbag is in the stowed state; and
    pivot away from the opening due to the airbag expanding to the deployed state.

* * * * *